(12) United States Patent  (10) Patent No.: US 9,106,757 B2
Kim et al.  (45) Date of Patent: Aug. 11, 2015

(54) TERMINAL, SERVER, AND METHOD FOR ACTIVELY PROVIDING INFORMATION BASED ON COMMUNICATION CONTENTS

(71) Applicant: LG Uplus Corp., Seoul (KR)

(72) Inventors: Young-Tae Kim, Seoul (KR); Hyo-Jin Lee, Osan-si (KR); Chang-Ik Lee, Seongnam-si (KR); Sena Jo, Uiwang-si (KR)

(73) Assignee: LG UPLUS CORP. (KR)

( * ) Notice: Subject to any disclaimer, the term of this patent is extended or adjusted under 35 U.S.C. 154(b) by 0 days.

(21) Appl. No.: 14/224,491

(22) Filed: Mar. 25, 2014

(65) Prior Publication Data

US 2014/0294167 A1  Oct. 2, 2014

(30) Foreign Application Priority Data

| Mar. 26, 2013 | (KR) | 10-2013-0031963 |
| Aug. 26, 2013 | (KR) | 10-2013-0100935 |
| Nov. 5, 2013 | (KR) | 10-2013-0133674 |
| Feb. 17, 2014 | (KR) | 10-2014-0017741 |
| Feb. 24, 2014 | (KR) | 10-2014-0021085 |

(51) Int. Cl.
*H04M 1/56* (2006.01)
*H04M 15/06* (2006.01)
*H04M 1/725* (2006.01)
*H04M 1/2745* (2006.01)

(52) U.S. Cl.
CPC .... *H04M 1/72519* (2013.01); *H04M 1/274516* (2013.01); *H04M 1/72561* (2013.01); *H04M 1/72566* (2013.01)

(58) Field of Classification Search
CPC ... H04M 3/42042; H04M 3/42; H04M 3/436; H04M 15/06; H04M 1/575; H04M 1/57
USPC ............... 379/142.01, 142.06, 142.17, 93.23, 379/88.01, 88.19; 455/415
See application file for complete search history.

(56) References Cited

U.S. PATENT DOCUMENTS

| 8,560,323 | B2 * | 10/2013 | Madhavapeddi et al. ...... 704/275 |
| 2006/0212866 | A1 * | 9/2006 | McKay .......................... 718/100 |
| 2008/0107100 | A1 * | 5/2008 | Begeja et al. .................. 370/352 |
| 2008/0240379 | A1 * | 10/2008 | Maislos et al. ............. 379/88.13 |
| 2009/0232288 | A1 * | 9/2009 | Forbes et al. ............... 379/93.23 |

(Continued)

FOREIGN PATENT DOCUMENTS

| JP | 07225796 | 8/1995 |
| JP | 2001075777 | 3/2001 |

(Continued)

*Primary Examiner* — Quoc D Tran
(74) *Attorney, Agent, or Firm* — Cantor Colburn LLP

(57) ABSTRACT

A terminal for actively providing information based on communication contents of a communication session. The terminal comprises a display unit that divides at least one of a schedule, Apps, REC, information regarding a matter of interest, and a contact into categories and displays, according to the categories, at least one of information regarding a communicator's matter of interest, schedule-related information, address book information corresponding to name information within a subscriber address book, first information relating to Apps within the subscriber terminal, and one or more App driving icons corresponding to the first information that are extracted from communication contents for at least one of a subscriber and a communication opponent in the communication session.

20 Claims, 32 Drawing Sheets

(56) References Cited

U.S. PATENT DOCUMENTS

| | | | |
|---|---|---|---|
| 2010/0246784 A1* | 9/2010 | Frazier et al. | 379/88.13 |
| 2013/0222431 A1* | 8/2013 | Joo et al. | 345/649 |

FOREIGN PATENT DOCUMENTS

| | | |
|---|---|---|
| JP | 2003115951 | 4/2003 |
| JP | 2003186897 | 7/2003 |
| JP | 2003323445 | 11/2003 |
| JP | 2004056290 | 2/2004 |
| JP | 2009232016 | 10/2009 |
| JP | 2012190160 | 10/2012 |
| KR | 1020080109322 | 12/2008 |
| KR | 1020090114719 | 11/2009 |
| KR | 1020100115960 | 10/2010 |
| KR | 1020120042006 | 5/2012 |
| KR | 101305995 | 9/2013 |

* cited by examiner

FIG. 6
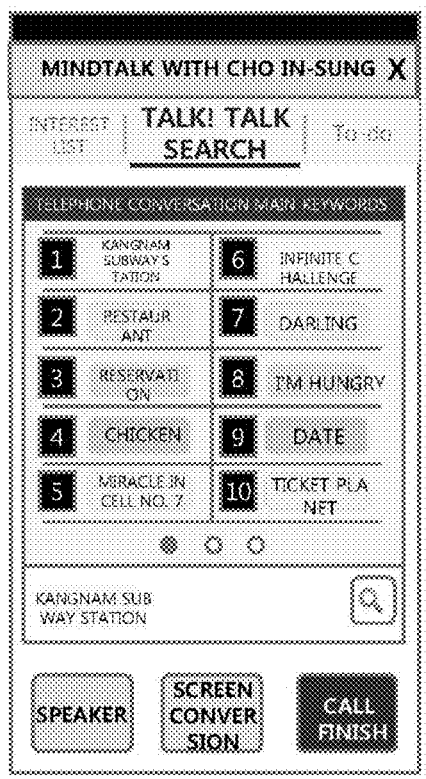
(a)
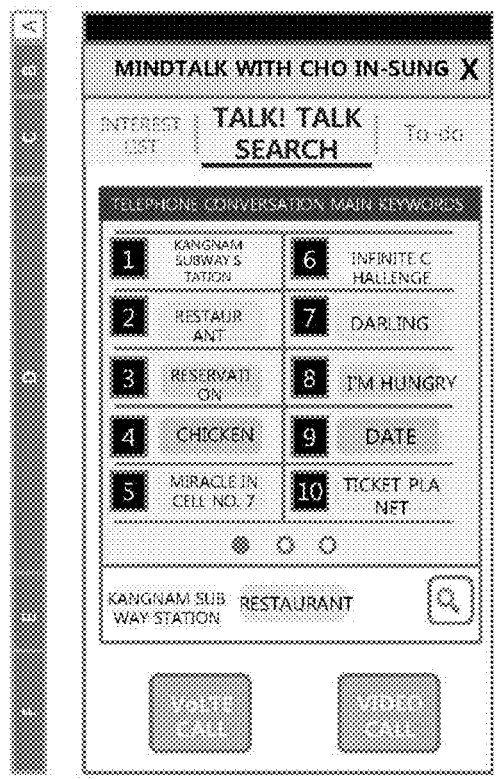
(b)

FIG. 14
(a)
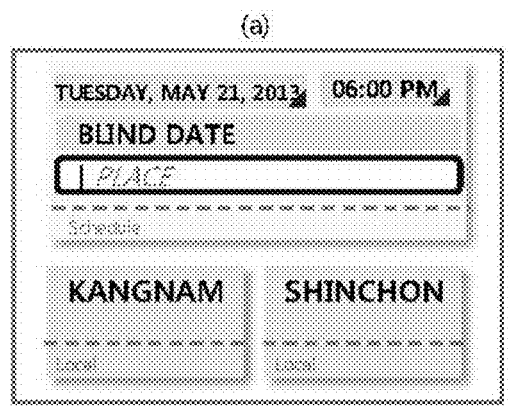
(b)
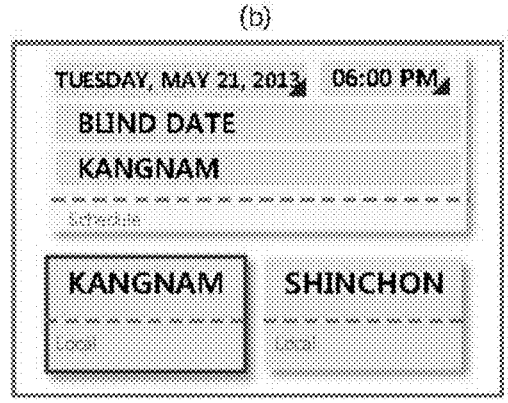
FIG. 15
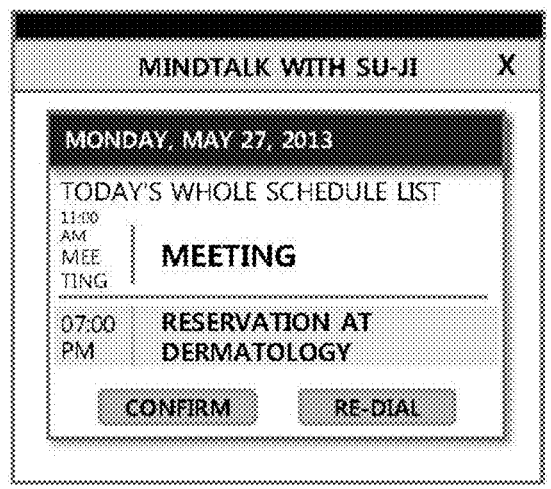

FIG. 29
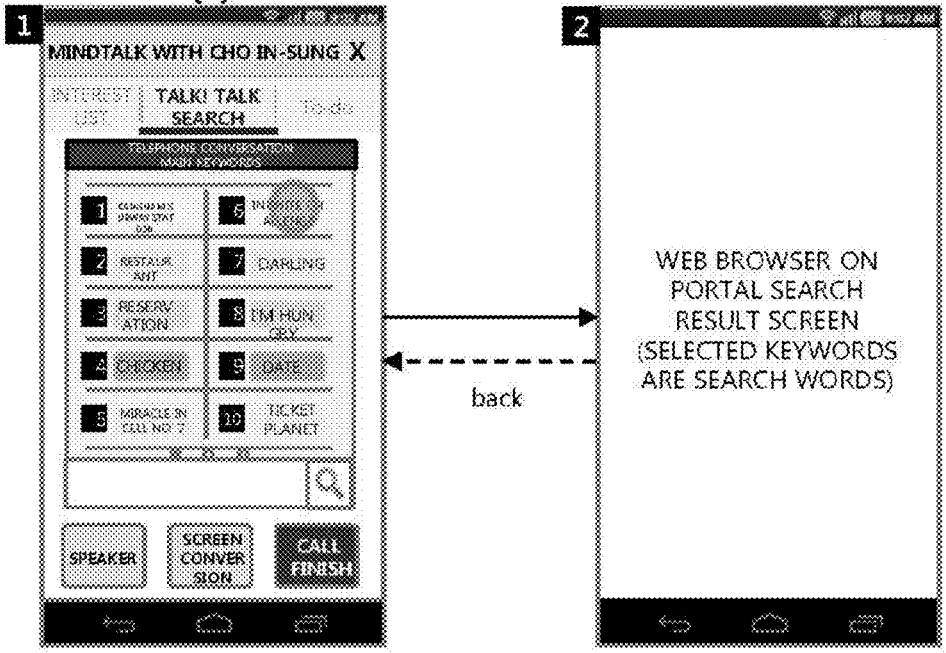
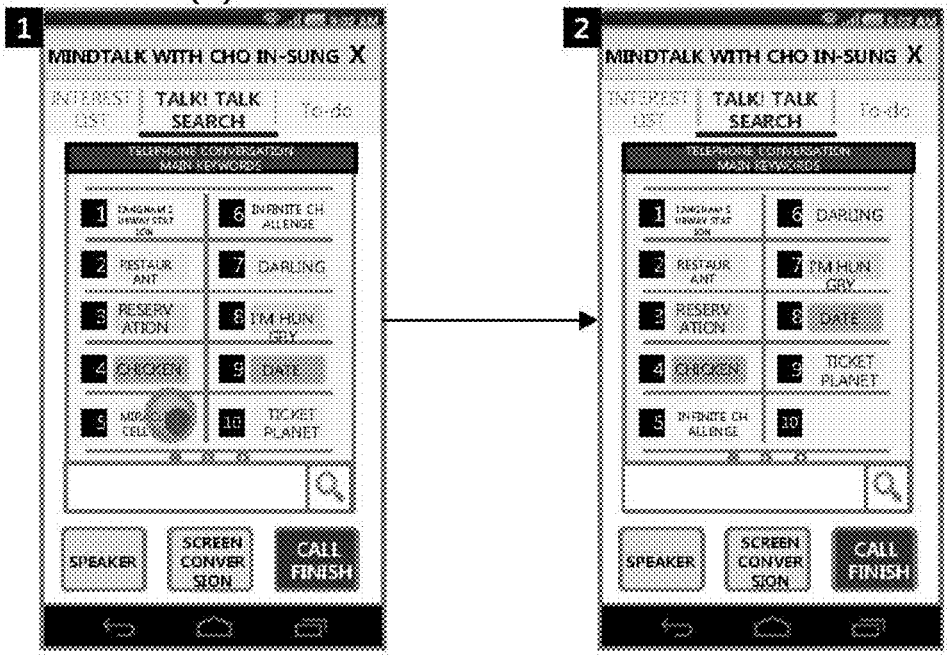

FIG. 30
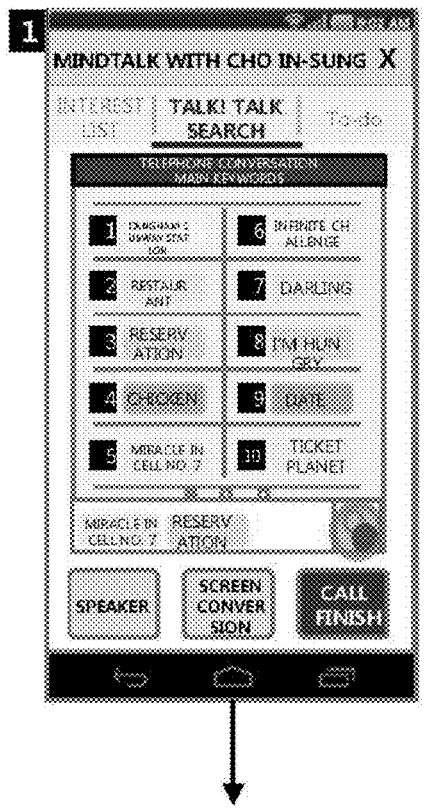
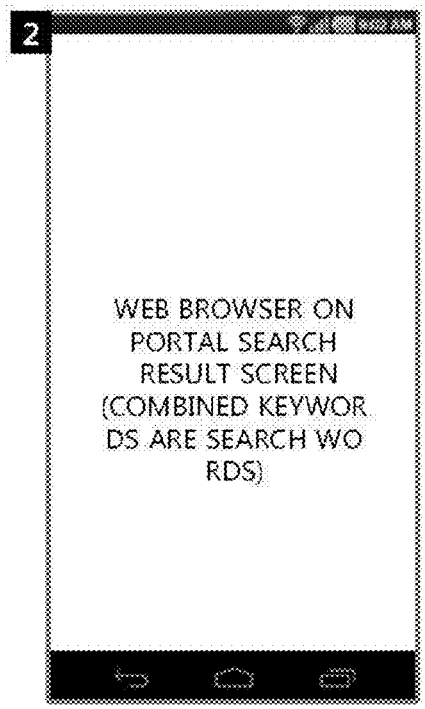

FIG. 36
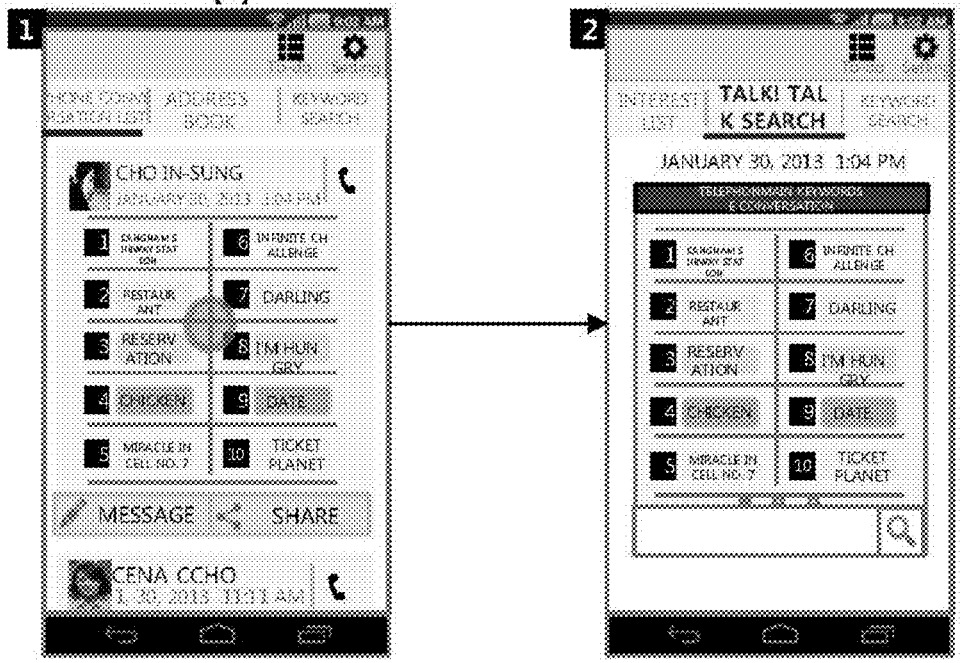
(a)
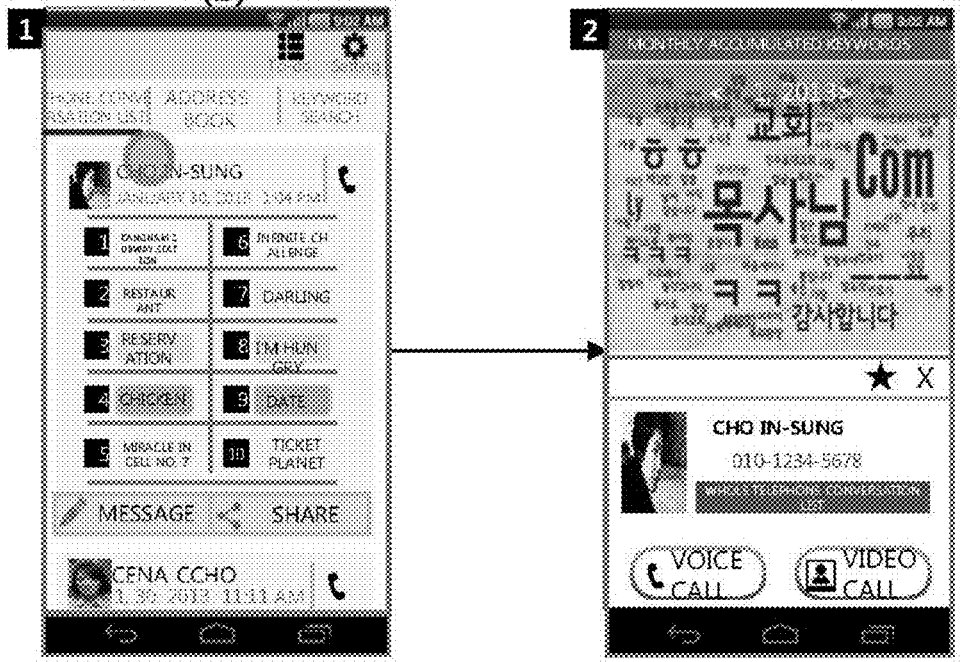
(b)

TERMINAL, SERVER, AND METHOD FOR ACTIVELY PROVIDING INFORMATION BASED ON COMMUNICATION CONTENTS

CROSS-REFERENCE TO RELATED PATENT APPLICATION

This application claims the benefit of Korean Patent Application Nos. 10-2013-0031963, filed on Mar. 26, 2013, 10-2013-0100935, filed on Aug. 26, 2013, 10-2013-0133674, filed on Nov. 5, 2013, 10-2014-0017741, filed on Feb. 17, 2014 and 10-2014-0021085, filed on Feb. 24, 2014 in the Korean Intellectual Property Office, the disclosure of which is incorporated herein in its entirety by reference.

BACKGROUND OF THE INVENTION

1. Field of the Invention

Embodiments of the present invention relate to technology that is capable of analyzing content of a telephone conversation based on voice recognition while talking over the telephone and actively extracting information required by a caller from the analyzed content of the telephone conversation and providing the extracted information to the caller.

2. Description of the Related Art

Voice recognition in smartphones has been applied and used in several ways. iPhone™ has provided a voice command function and enables voice execution of a simple command, such as App (application) execution, and Google has provided a web surfing service with voice.

In addition, a translation application that translates user's voice into other languages, or applications for inspecting whether the user's voice is in tune may be regarded as examples using voice recognition technology.

In the meantime, the appearance of 'Speech Interpretation and Recognition Interface (Siri™)' has suggested a new jump of voice recognition technology. Siri that is a voice recognition service provided by Apple Inc. has first emerged at iPhone 4S™, 2011. Siri has been originally developed when some services of a Cognitive Assistant that Learns and Organizes (CALO) project that has been developed for a military purpose are commercialized. Siri has been first provided to iPhone 3GS™ as an application, has enjoyed great popularity and has been exclusively acquired by Apple Inc. in April, 2010 such that current Apple's Siri has come into the world. Features of Siri are that Siri does not simply recognize voice but enables a user to solve all works with one voice command while interlocking with various applications, learns user's voice to improve a recognition rate by providing a learning recognition function and has an algorithm which is capable of replying to various questions based on a database center using conversation processing, in particular. Also, the reason why only Siri has enjoyed great popularity is the possibility of free expressions like talking with a person. This may be a very marvelous development compared to existing voice recognition services in which voice has been successfully recognized only when a user should speak in a sentence in a designated format.

Since then, voice recognition services, such as S voice by Samsung Electronics Co., Ltd., Q voice by LG Electronics Inc., and Smart voice by Pantech, have emerged, and an environment in which smartphones can be more conveniently used, is providing.

However, since the existing voice recognition services mentioned above are specialized in functions, such as terminal control according to voice commands (for example, connecting call according to a voice command, alarm, scheduling, mail/text message sending) and search support (for example, web browser connecting) regarding matters that a user may be curious, according to the voice command, there are limitations that the existing voice recognition services are based on a passive operation according to the user's command.

SUMMARY OF THE INVENTION

The present invention provides a terminal, a server, and a method for actively providing information based on communication contents and a recording medium therefor, whereby content of a telephone conversation is analyzed based on voice recognition while talking over a telephone and information required by a caller can be actively extracted from the analyzed content of the telephone conversation and the extracted information can be provided to the caller.

The present invention also provides a terminal, a server, and a method for actively providing information based on communication contents and a recording medium therefor, whereby content of a telephone conversation is analyzed based on voice recognition while talking over a telephone and a caller's matter of interest can be actively extracted from the analyzed content of the telephone conversation and the extracted information can be provided to the caller.

The present invention also provides a terminal, a server, and a method for actively providing information based on communication contents and a recording medium therefor, whereby communication contents are analyzed and words/sentences regarding a schedule can be actively extracted from the analyzed communication contents and the extracted words/sentences regarding the schedule can be provided to a caller and can be reflected on the caller's schedule.

The present invention also provides a terminal, a server, and a method for actively providing information based on communication contents and a recording medium therefor, whereby communication contents are analyzed based on a subscriber's address book and information regarding the address book corresponding to names mentioned while talking over a telephone can be provided to a caller.

The present invention also provides a terminal, a server, and a method for actively providing information based on communication contents and a recording medium therefor, whereby information regarding Apps (applications) can be actively extracted from subscriber's communication contents and can be actively provided to a caller so that the Apps can be immediately driven by the subscriber's terminal.

According to an aspect of the present invention, there is provided a terminal for actively providing information based on communication contents or a method being performed by the terminal, including: a display unit or (a) dividing at least one among a schedule, Apps, REC (a voice memo), information regarding a matter of interest, and a contact according to categories and displaying at least one among information regarding a communicator's matter of interest, schedule-related information, address book information corresponding to name information within a subscriber address book, first information relating to Apps within the subscriber terminal, and one or more App driving icons corresponding to the first information, extracted from communication contents of at least one of a subscriber himself/herself and a communication opponent, according to the categories; a schedule reflecting unit or (b) reflecting the displayed schedule-related information on a schedule and storing the reflected schedule-related information; an alarm unit or (c) providing an alarm for an overlapping schedule when the schedule-related information stored by the schedule reflecting unit or in the (b) overlaps with already-stored schedule information; an App driving unit or (d) driving Apps when the one or more App driving icons displayed by the display unit or in the (a) are selected; a receiving unit or (e) receiving at least one of information regarding the communicator's matter of interest, schedule-related information, address book information corresponding to name information within a subscriber address book, first information relating to Apps within the subscriber terminal, and one or more App driving icons corresponding to the first information from a server according to user's selection or automatically during communication or immediately after the communication is finished; a schedule correcting unit or (f) editing or correcting the schedule-related information displayed by the display unit or in the (a) according to the user's selection; and a transmitting unit or (g) transmitting name information within the subscriber address book or information regarding Apps installed within the subscriber terminal to the server when the subscriber's communication is performed or in advance.

The display unit or the (a) may include matching at least one of information regarding the communicator's matter of interest, schedule-related information, address book information corresponding to name information within a subscriber address book, first information relating to Apps within the subscriber terminal, and one or more App driving icons corresponding to the first information with subscriber's communication opponent information and displaying the result of matching. The communication opponent information may include information regarding an opponent in an address book or a telephone conversation list. The display unit or the (a) may include displaying the received information immediately after the information is received from the server in the (e).

According to another aspect of the present invention, there is provided a server for actively providing information based on communication contents or a method being performed by the server, including: an information extracting unit or (a) dividing at least one among a schedule, Apps, REC, information regarding a matter of interest, and a contact according to categories and extracting at least one among information regarding a communicator's matter of interest, schedule-related information, address book information corresponding to name information within a subscriber address book, first information relating to Apps within the subscriber terminal, and second information regarding one or more App driving icons corresponding to the first information, from communication contents of at least one of a subscriber himself/herself and a communication opponent, according to the categories; an information providing unit or (b) providing the information extracted by the information extracting unit or in the (a) to the subscriber's terminal; an information obtaining unit or (c) obtaining name information within the subscriber address book or information regarding Apps installed within the subscriber terminal when the subscriber's communication is performed or in advance; and an information deleting unit or (d) deleting the obtained name information or App information when the subscriber's communication is finished.

The information providing unit or the (b) may include matching the information extracted by the information extracting unit or in the (a) with subscriber's communication opponent information and providing the result of matching to the subscriber terminal. The communication opponent information may include information regarding an opponent in an address book or a telephone conversation list of the subscriber terminal.

The information providing unit or the (b) may include providing the information extracted by the information extracting unit or in the (a) to the subscriber terminal according to user's selection or automatically while communication is performed or immediately after the communication is finished.

According to still another aspect of the present invention, there is provided a terminal for actively providing information based on communication contents, the terminal including a display unit that matches information regarding a caller's matter of interest extracted from content of a telephone conversation of at least one of the caller himself/herself and an opponent, with opponent information and displays the result of matching.

According to yet still another aspect of the present invention, there is provided a terminal for actively providing information based on communication contents, the terminal including: a schedule display unit that displays schedule-related information extracted from communication contents of at least one of a subscriber himself/herself and a communication opponent; and a schedule reflecting unit that reflects the displayed schedule-related information on a schedule and stores the reflected schedule-related information.

According to yet still another aspect of the present invention, there is provided a terminal for actively providing information based on communication contents, the terminal including: an information obtaining unit that obtains name information within a subscriber address book extracted from communication contents of at least one of a subscriber himself/herself and a communication opponent; and an information display unit that extracts address book information corresponding to the obtained name information from the subscriber address book and displays the result of extraction.

According to yet still another aspect of the present invention, there is provided a terminal for actively providing information based on communication contents, the terminal including: an App display unit that displays one or more App driving icons corresponding to first information relating to Apps within a subscriber terminal extracted from communication contents of at least one of a subscriber himself/herself and a communication opponent; and an App driving unit that drives Apps when the displayed one or more App driving icons are selected.

According to yet still another aspect of the present invention, there is provided a server for actively providing information based on communication contents, the server including: an information extracting unit that extracts information regarding a caller's matter of interest based on content of a subscriber's telephone conversation; and an information providing unit that matches the extracted information regarding the caller's matter of interest with the subscriber's telephone conversation opponent information and provides the result of matching to the subscriber's terminal.

According to yet still another aspect of the present invention, there is provided a server for actively providing information based on communication contents, the server including: an information extracting unit that extracts schedule-related information from subscriber's communication contents; and an information providing unit that provides the extracted schedule-related information to the subscriber's terminal.

According to yet still another aspect of the present invention, there is provided a server for actively providing information based on communication contents, the server including: an information obtaining unit that obtains name information within a subscriber address book when the subscriber's communication is performed; an information extracting unit that extracts the obtained name information from the subscriber's communication contents; and an information providing unit that provides the extracted name information to the subscriber's terminal.

According to yet still another aspect of the present invention, there is provided a server for actively providing information based on communication contents, the server including: an information extracting unit that extracts first information relating to App information and extracts second information regarding App driving icons corresponding to the extracted first information from subscriber's communication contents; and an information providing unit that provides the extracted first or second information to the subscriber's terminal.

According to yet still another aspect of the present invention, there is provided a method for actively providing information based on communication contents, the method being performed by a user terminal and including matching information regarding a caller's matter of interest extracted based on content of a telephone conversation of at least one of a user himself/herself and an opponent, with opponent information and displaying the result of matching.

According to yet still another aspect of the present invention, there is provided a method for actively providing information based on communication contents, the method being performed by a terminal and including: (a) displaying schedule-related information extracted from subscriber's communication contents; and (b) reflecting the displayed schedule-related information on a schedule and storing the reflected schedule-related information.

According to yet still another aspect of the present invention, there is provided a method for actively providing information based on communication contents, the method being performed by a terminal and including: (a) obtaining name information within a subscriber address book extracted from communication contents of at least one of a subscriber himself/herself and a communication opponent; and (b) extracting address book information corresponding to the name information obtained in the (a) from the subscriber address book and displaying the result of extraction.

According to yet still another aspect of the present invention, there is provided a method for actively providing information based on communication contents, the method being performed by a terminal and including: (a) displaying one or more App driving icons corresponding to first information relating to Apps within a subscriber terminal extracted from communication contents of at least one of a subscriber himself/herself and a communication opponent; and (b) driving Apps when the displayed one or more App driving icons are selected.

According to yet still another aspect of the present invention, there is provided a method for actively providing information based on communication contents, the method being performed by a server and including: (a) extracting information regarding a caller's matter of interest based on content of a subscriber's telephone conversation; and (b) matching the extracted information regarding the caller's matter of interest with the subscriber's telephone conversation opponent information and providing the result of matching to the subscriber's terminal.

According to yet still another aspect of the present invention, there is provided a method for actively providing information based on communication contents, the method being performed by a server and including: (a) extracting schedule-related information from subscriber's communication contents; and (b) providing the extracted schedule-related information to the subscriber's terminal.

According to yet still another aspect of the present invention, there is provided a method for actively providing information based on communication contents, the method being performed by a server and including: (a) obtaining name information stored in a subscriber address book when the subscriber's communication is performed; (b) extracting the obtained name information from the subscriber's communication contents; and (c) providing the name information extracted in the (b) to the subscriber's terminal.

According to yet still another aspect of the present invention, there is provided a method for actively providing information based on communication contents, the method being performed by a server and including: (a) extracting first information relating to App information and extracting second information regarding App driving icons corresponding to the extracted first information from subscriber's communication contents; and (b) providing the extracted first or second information to the subscriber's terminal.

According to yet still another aspect of the present invention, there is provided a computer readable recording medium having recorded thereon a program for executing various methods for actively providing information based on communication contents, the methods being performed by a terminal or server, as described above, on a computer.

BRIEF DESCRIPTION OF THE DRAWINGS

The above and other features and advantages of the present invention will become more apparent by describing in detail exemplary embodiments thereof with reference to the attached drawings in which:

FIG. 6 illustrates a display screen of main keyword information at the user terminal, according to a first embodiment of the present invention;

FIG. 14 illustrates an example of a screen on which the schedule-related information displayed on the terminal is edited/corrected, according to a second embodiment of the present invention;

FIG. 15 illustrates an example of a schedule list displayed on the screen of the terminal, according to a second embodiment of the present invention;

FIGS. 27 through 37 illustrate an execution screen while talking over the telephone of the user terminal according to the first embodiment of the present invention.

DETAILED DESCRIPTION OF THE INVENTION

Figure 1:
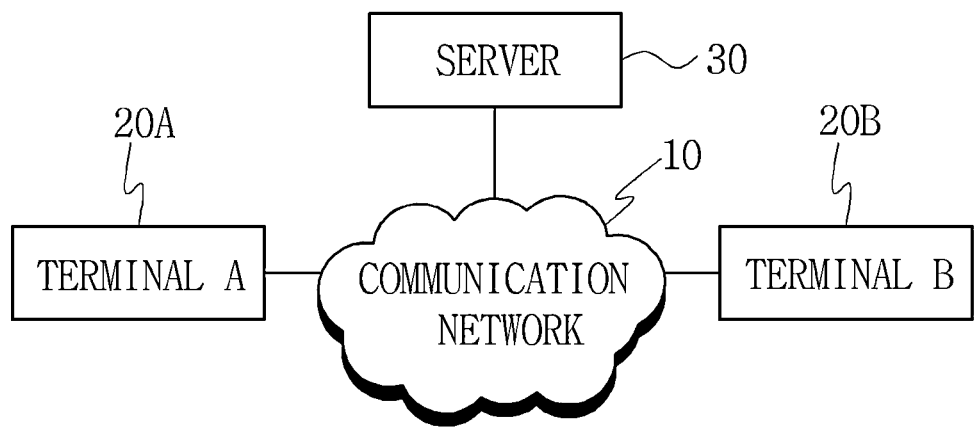
FIG. 1 illustrates a configuration of a system for actively providing information based on communication contents according to an embodiment of the present invention.

The present invention will now be described more fully with reference to the accompanying drawings, in which exemplary embodiments of the invention are shown.

When reference numerals are added to elements of the drawings, the same reference numerals are used for the same elements as possible even if these elements are represented on different drawings. In the description of the present invention, if it is determined that a detailed description of commonly-used technologies or structures related to the invention may obscure the subject matter of the invention, the detailed description will be omitted.

FIG. 1 illustrates a configuration of a system for actively providing information based on communication contents according to an embodiment of the present invention. As illustrated in FIG. 1, the system may include a communication network 10, a terminal A (20A), a terminal B (20B), and a server 30.

The communication network 10 may be a single or combined network that enables a user to make communication, such as a voice call, a video call, and a chatting-messaging service, for example, a short message service (SMS), a multimedia message service (MMS), or a social network service (SNS), by connecting the terminal A (20A), the terminal B (20B), and the server 30 in a wired or wireless manner and/or via the Internet.

One of the terminal A (20A) and the terminal B (20B) represents a terminal of a user who makes a call, and the other one thereof represents a terminal of a user who answers the call. For example, the terminal A (20A) and the terminal B (20B) may be one selected from a group including a mobile phone, a personal digital assistant (PDA), a smartphone, and a tablet personal computer (PC), which are capable of performing services, such as voice communication, video communication, data communication, and Internet communication. In the current embodiment, at least one of users of the sending/receiving terminals 20A and 20B may be a subscriber of the services.

The terminal A (20A) and the terminal B (20B) may divide at least one among a schedule, Apps, REC, information regarding a matter of interest, and a contact according to categories, may receive at least one among information regarding a caller's matter of interest, schedule-related information, address book information corresponding to name information within a subscriber address book, first information relating to Apps within the subscriber terminal, and one or more App driving icons corresponding to the first information, which are extracted from communication contents of at least one of a subscriber himself/herself and a communication opponent, from the server 30 and may display various pieces of received information according to the categories.

The server 30 may divide communication contents between the terminal A (20A) and the terminal B (20B) into categories, such as a schedule, Apps, REC, information regarding a matter of interest, and a contact, using a voice recognition solution function and a situation perception solution function, may analyze the communication contents, may extract at least one among information regarding a caller's matter of interest, schedule-related information, address book information corresponding to name information within the subscriber address book, first information relating to Apps within the subscriber terminal, and second information regarding one or more App driving icons corresponding to the first information from the communication contents according to the categories based on the result of analysis and may transmit various pieces of extracted information to the subscriber terminal 20A or 20B.

Figure 2:
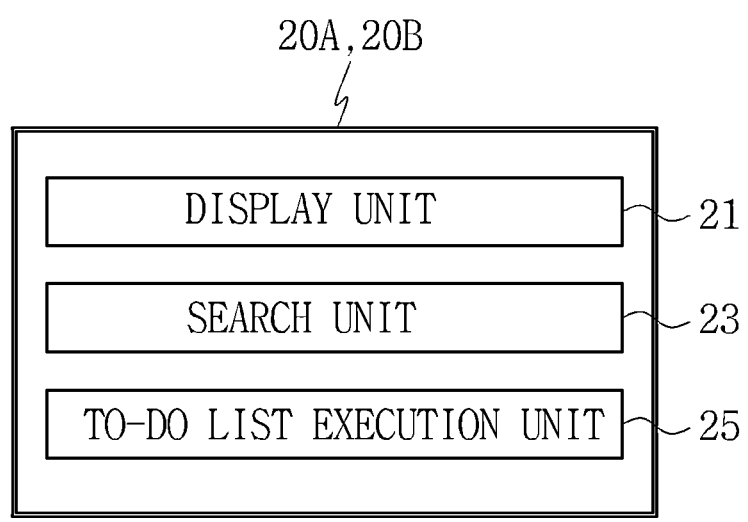
FIG. 2 illustrates a configuration of a terminal for actively providing information based on communication contents according to a first embodiment of the present invention.

FIG. 2 illustrates a configuration of a terminal for actively providing information based on communication contents according to a first embodiment of the present invention. FIG. 2 illustrates an example of a detailed configuration of the terminal A (20A) or the terminal B (20B) of FIG. 1. As illustrated in FIG. 2, the terminal for actively providing information based on communication contents according to the first embodiment of the present invention may include a display unit 21, a searching unit 23, and a To-do list execution unit 25. In the first embodiment, the terminal A (20A) will be described below.

Figure 7:
FIG. 7 illustrates a display screen of interest list information at the user terminal, according to a first embodiment of the present invention.
Figure 8:
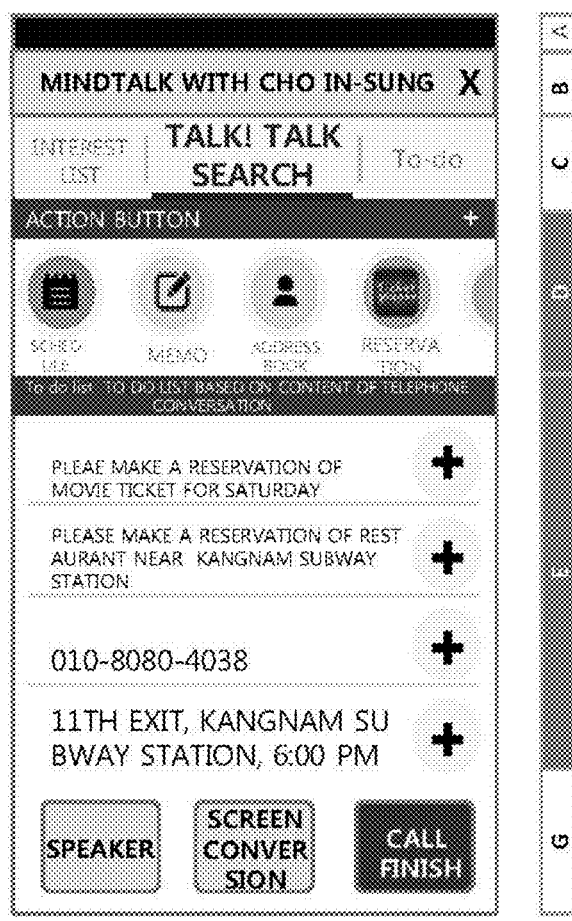
FIG. 8 illustrates a To-do list information display screen at the user terminal, according to a first embodiment of the present invention.

The display unit 21 may selectively receive main keyword information as information regarding a caller's matter of interest extracted from the server 30, To-do list information, and interest list information according to user's selection based on content of a communication session (e.g., a telephone conversation) of at least one of the subscriber himself/herself and the communication opponent from content of a communication session between the subscriber's own terminal A (20A) and the opponent terminal B (20B) and may display the received main keyword information, the To-do list information, and the interest list information on a screen. For example, as illustrated in FIG. 6, if a "Talk! Talk" search menu is selected, the display unit 21 may receive main keyword information (for example, Kangnam subway station, restaurants, ticket reservation) based on content of the telephone conversation from the server 30, may match the main keyboard information with telephone conversation opponent information and may display the result of matching on the screen, and as illustrated in FIG. 7, if an interest list menu is selected, the display unit 21 may receive interest list information (for example, Kangnam subway station, restaurant, movie ticket reservation) based on content of the telephone conversation from the server 30, may match the interest list information with telephone conversation opponent information and may display the result of matching on the screen, and as illustrated in FIG. 8, if a To-do menu is selected, the display unit 21 may receive To-do list information (for example, please make a reservation of a movie ticket for Saturday) based on content of the telephone conversation from the server 30, may match the To-do list information with telephone conversation opponent information and may display the result of matching on the screen.

For example, when a user of the terminal B (20B) who is a telephone conversation opponent with respect to the subscriber terminal A (20A) is not a service subscriber according to the current embodiment, the server 30 may extract information regarding a caller's matter of interest by analyzing the user's content of voice conversation and may provide the extracted information regarding the caller's matter of interest to the subscriber terminal A (20A). In this case, the display unit 21 of the subscriber terminal A (20A) matches the information regarding the caller's matter of interest provided from the server 30 with conversation component's information and may display the result of matching on the screen.

In contrast, when the user of the terminal B (20B) who is a telephone conversation opponent with respect to the subscriber terminal A (20A) is also a service subscriber according to the current embodiment, the server 30 may extract information regarding a caller's matter of interest by simultaneously analyzing content of voice conversation of the user of the subscriber terminal A (20A) and content of voice conversation of the user of the opponent terminal B (20B), and may provide the extracted information regarding the caller's matter of interest to the subscriber terminal A (20A). In this case, the display unit 21 of the subscriber terminal A (20A) matches the information regarding the caller's matter of interest provided from the server 30 with conversation component's information and may display the result of matching on the screen. In this case, the server 30 may provide the information regarding the caller's matter of interest that is extracted, as described above, to the subscriber terminal B (20B) according to selection from the subscriber terminal B (20B). In this case, the display unit 21 of the subscriber terminal B (20B) may match the information regarding the caller's matter of interest provided from the server 30 with conversation opponent's information, i.e., information of the user of the subscriber terminal A (20A) and may display the result of matching on the screen.

As described above, the display unit 21 according to the first embodiment of the present invention may match the information regarding the caller's matter of interest provided from the server 30 with telephone conversation opponent information and may display the result of matching on the screen. Here, the telephone conversation opponent information may be conversation opponent's information that is present in a subscriber terminal's address book or telephone conversation list.

In the first embodiment, the main keyword information displayed on the screen as illustrated in FIG. 6 or the interest list information displayed on the screen as illustrated in FIG. 7 may be configured of words, of which saying characteristics (utterance characteristics), such as the number of times being mentioned, volume size, speed, and pronunciation accuracy among content of the telephone conversation, meet with a predetermined reference. For example, the display unit 21 may adjust display rankings of the words based on the saying characteristics of the words and may display the adjusted display rankings of the words (for example, in FIGS. 6 and 7, in the order of keywords having a large number of the saying characteristics, like 1. Kangnam subway station, 2. restaurants, 3. reservation, 4. chicken). Alternatively, the display unit 21 may adjust letter color, letter shape, or letter size of the words based on the saying characteristics of the words and may display the adjusted letter color, letter shape, or letter size of the words or may adjust the size, shape, and color of an image in the vicinity of the letter.

Also, in the first embodiment, the To-do list information displayed on the screen as illustrated in FIG. 8 may be configured of sentences including a request type sentence and a command type sentence, or particular words that need to accompany an action among content of the telephone conversation.

For example, the display unit 21 according to the first embodiment of the present invention may receive one selected from a group including the main keyword information, the To-do list information, and the interest list information from the server 30 in real-time according to user's selection while talking over the telephone at predetermined time intervals and may update and display the received information on the screen. Alternatively, the display unit 21 may receive one selected from a group including the main keyword information, the To-do list information, and the interest list information that are extracted from content of the telephone conversation and are log-stored according to the user's selection after the telephone conversation is finished and may display the received information on the screen.

The searching unit 23 according to the first embodiment of the present invention may search detailed information by automatically executing an Internet search tool, for example, a web browser or an Internet portal site, based on keywords selected by the user from a group including the main keyword information and the interest list information that are information regarding the caller's matter of interest displayed by the display unit 21.

The To-do list execution unit 25 according to the first embodiment of the present invention may execute an associated App based on one selected by the user from the To-do list information displayed by the display unit 21 so as to execute the user's To-do list included in content of the telephone conversation, for example, scheduling, memo, address book arrangement, and ticket reservation.

Figure 3:
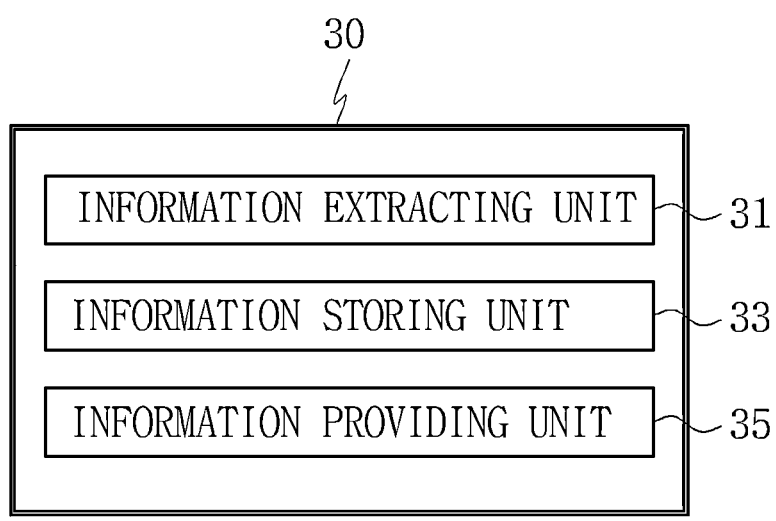
FIG. 3 illustrates a configuration of a server for actively providing information based on communication contents according to a first embodiment of the present invention.

FIG. 3 illustrates a configuration of a server for actively providing information based on communication contents according to a first embodiment of the present invention. FIG. 3 illustrates an example of a detailed configuration of the server 30 of FIG. 1. As illustrated in FIG. 3, the server 30 for actively providing information based on communication contents according to the first embodiment of the present invention may include an information extracting unit 31, an information storing unit 33, and an information providing unit 35.

The information extracting unit 31 according to the first embodiment of the present invention may extract information regarding the caller's matter of interest including the main keyword information, the To-do list information, and the interest list information based on content of the telephone conversation. For example, the information extracting unit 31 may extract the main keyword information or the interest list information based on the words, of which saying characteristics, such as the number of times being mentioned, volume size, speed, and pronunciation accuracy among content of the telephone conversation, meet with a predetermined reference. The extracted main keyword information or interest list information may include information regarding the saying characteristics of the words, or the display rankings at the terminal may be sorted according to the information regarding the saying characteristics of the words.

For example, when the user of the terminal B (20B), who is a telephone conversation opponent with respect to the subscriber terminal A (20A) that is one of the sending/receiving sides, is not a service subscriber according to the current embodiment, the information extracting unit 31 may extract the information regarding the caller's matter of interest by analyzing only content of voice conversation of the user of the subscriber terminal A (20A). In contrast, when the user of the terminal B (20B) who is a telephone conversation opponent with respect to the subscriber terminal A (20A) is also a service subscriber according to the current embodiment, the information extracting unit 31 may extract the information regarding the caller's matter of interest by simultaneously analyzing content of voice conversation of the user of the subscriber terminal A (20A) and content of voice conversation of the user of the subscriber terminal B (20B).

The information regarding saying characteristics may include information regarding the number and type of the saying characteristics of the particular keywords (words) extracted as the information regarding the caller's matter of interest (for example, whether the information regarding saying characteristics has how many, which saying characteristics among the number of times being mentioned, volume size, speed, and pronunciation accuracy), and/or a degree of the saying characteristics (for example, the number of times being repeated, a degree of volume size, and a degree of pronunciation accuracy), for example.

The information storing unit 33 according to the first embodiment of the present invention may log-store the main keyword information, the To-do list information, and the interest list information that are the information regarding the caller's matter of interest extracted by the information extracting unit 31. The information storing unit 33 may be configured of an additional cloud server.

The information providing unit 35 according to the first embodiment of the present invention may provide one selected by a terminal from a group including the main keyword information, the To-do list information, and the interest list information that are extracted by the information extracting unit 31 or log-stored by the information storing unit 33 to the terminal. For example, the information providing unit 35 may match one selected by the terminal from a group including the main keyword information, the To-do list information, and the interest list information extracted from content of a real-time telephone conversation according to the user's selection while the user is talking over the telephone with the telephone conversation opponent information at predetermined time intervals during the telephone conversation and may provide the result of matching to the terminal. Alternatively, the information providing unit 35 may match one selected by the terminal from a group including of the main keyword information, the To-do list information, and the interest list information that are log-stored in the information storing unit 33 after the telephone conversation is finished, with the telephone conversation opponent information and may provide the result of matching to the terminal.

Figure 4:
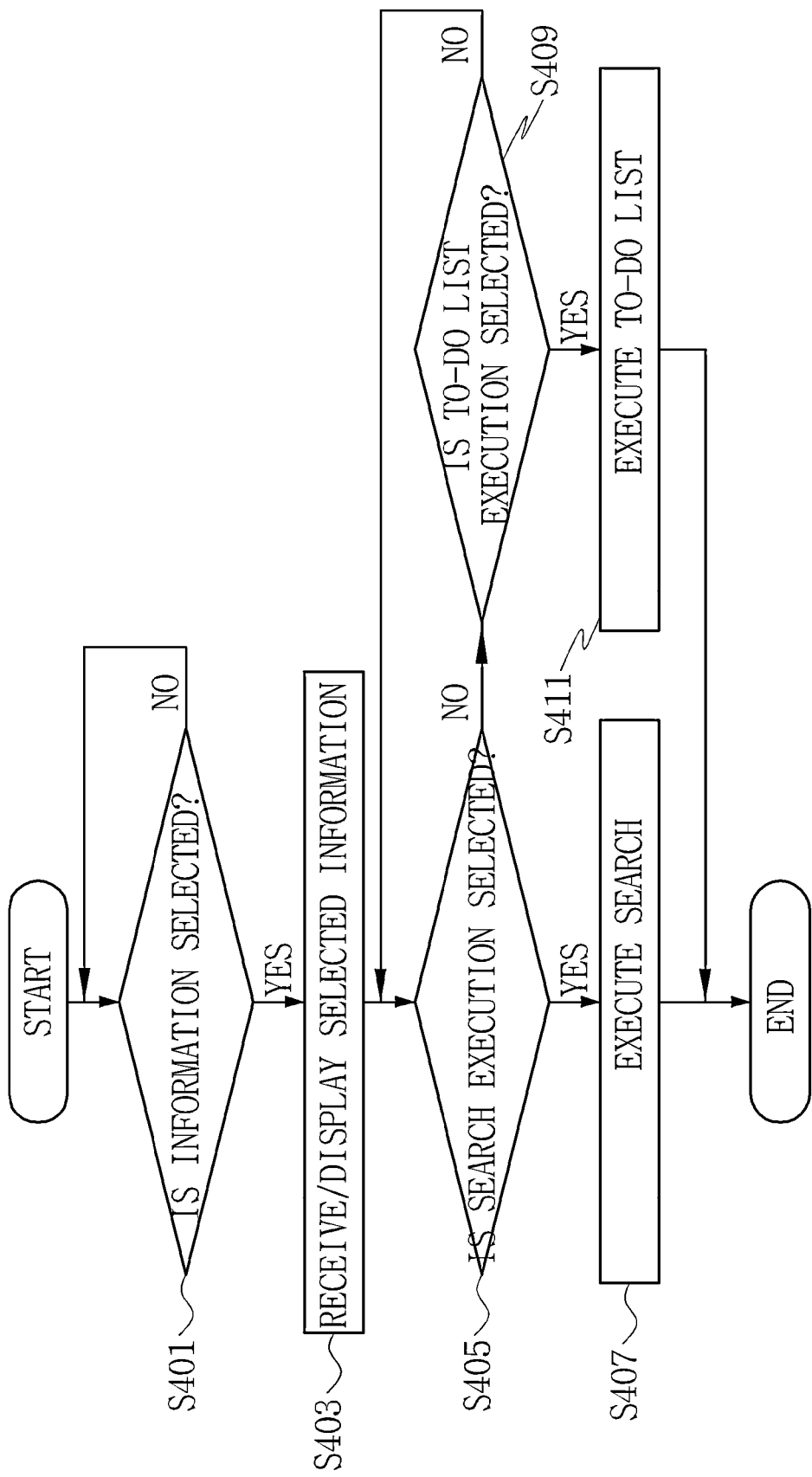
FIG. 4 is a flowchart illustrating a method for actively providing information based on communication contents, the method being performed by a user terminal, according to a first embodiment of the present invention.

FIG. 4 is a flowchart illustrating a method for actively providing information based on communication contents, the method being performed by a user terminal, according to a first embodiment of the present invention. The method for actively providing information based on communication contents illustrated in FIG. 4 is applied to the terminal A (20A) or the terminal B (20B) of FIGS. 1 and 2 and thus will be described by describing operations of the terminal A (20A) and the terminal B (20B) together.

First, the display unit 21 determines which one among main keyword information, To-do list information, and interest list information that are information regarding a caller's matter of interest is selected by the user. For example, the display unit 21 determines which one of a "Talk! Talk" search menu corresponding to the main keyword information displayed on a part of the screen of the display unit 21, a To-do list menu corresponding to the To-do list information, and an interest list menu corresponding to the interest list information is selected by the user (S401), and if, as a result of determination in Operation S401, "Talk! talk" search menu as illustrated in FIG. 6 is selected, the display unit 21 receives the main keyword information from the server 30, matches the received main keyword information with telephone conversation opponent information and displays the result of matching, and if, as a result of determination in Operation S401, the interest list menu as illustrated in FIG. 7 is selected, the display unit 21 receives the interest list information from the server 30, matches the received interest list information with the telephone conversation opponent information, and displays the result of matching, and if, as a result of determination in Operation S401, the To-do list menu is selected as illustrated in FIG. 8, the display unit 21 receives the To-do list information from the server 30, matches the received To-do list information with the telephone conversation opponent information, and displays the result of matching. For example, if a menu selection time is a time when the user talks over the telephone, the display unit 21 may receive information that is extracted in real-time, at predetermined time intervals (about 10 seconds) from the server 30 and may update and display the received information, and if the menu selection time is a time when the telephone conversation is finished, the display unit 21 may receive the log-stored information from the server 30 and may display the received information (S403).

Subsequently, if particular words are selected from the main keyword information or the interest list information displayed in Operation S403 (S405), the display unit 21 may execute searching by using the selected words as keywords and may display the result of searching (S407), and if particular information and an associated App are selected from the To-do list information displayed in Operation S403 (S409), the display unit 21 may cause the associated App to be driven (executed) according to content of the selected To-do list information and to execute the user's To-do list included in content of the telephone conversation (S411).

Figure 5:
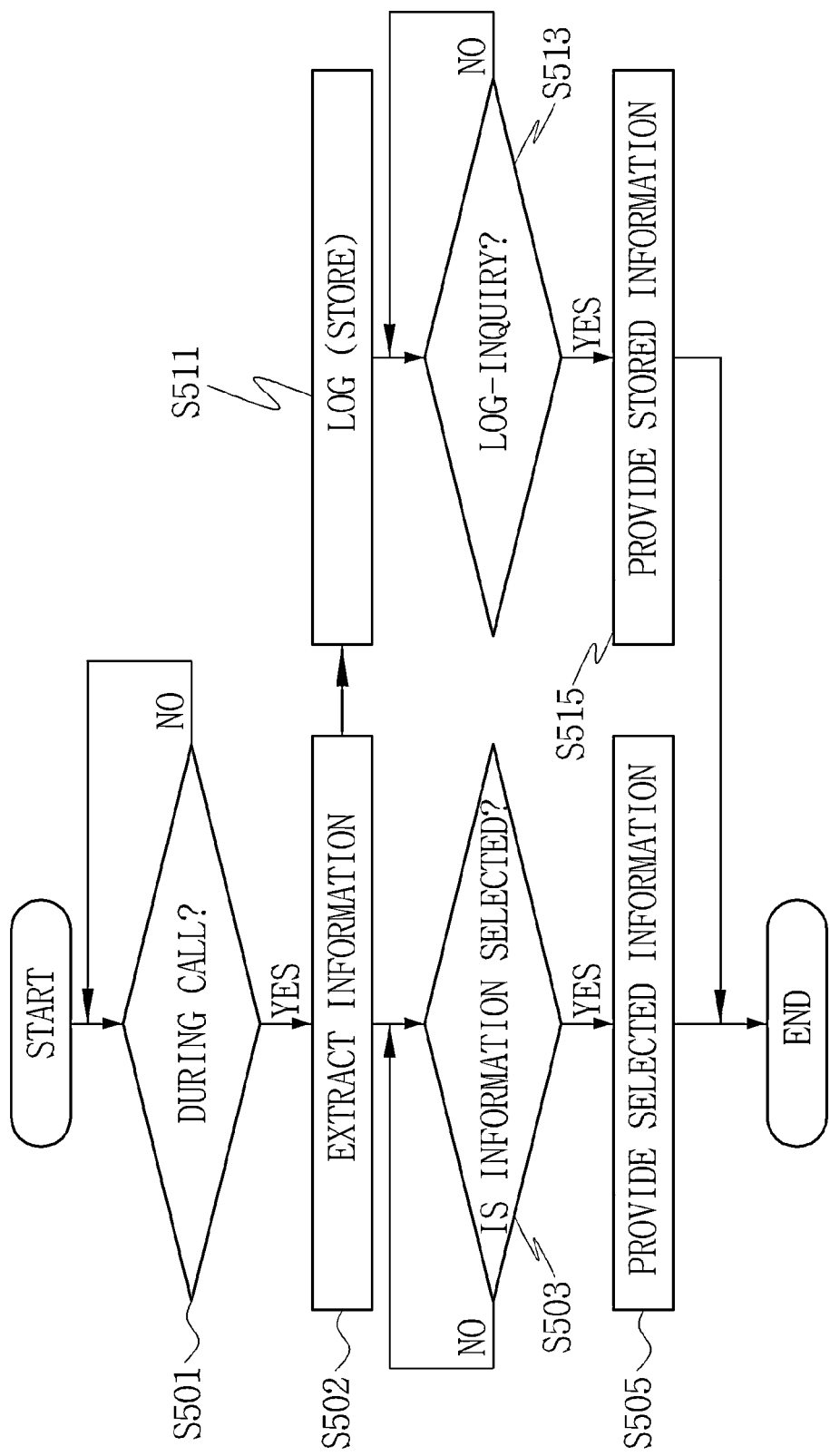
FIG. 5 is a flowchart illustrating a method for actively providing information based on communication contents, the method being performed by a service server, according to a first embodiment of the present invention.

FIG. 5 is a flowchart illustrating a method for actively providing information based on communication contents, the method being performed by a service server, according to a first embodiment of the present invention. The method for actively providing information based on communication contents according to the first embodiment of the present invention illustrated in FIG. 5 is applied to the server 30 of FIGS. 1 and 3 and thus will be described by describing the operation of the server 30 together.

First, if a telephone conversation between the terminal A (20A) and the terminal B (20B) starts (S501), information regarding a caller's matter of interest including main keyword information, To-do list information, and interest list information is extracted from content of a telephone conversation in real-time (S502).

Subsequently, it is checked which one of a "Talk! talk" search menu corresponding to the main keyword information, a To-do list menu corresponding to the To-do list information, and an interest list menu corresponding to the interest list information is selected from the terminal A (20A) or the terminal B (20B) (S503), and real-time extracted information (information regarding the caller's matter of interest) corresponding to the selected menu is matched with telephone conversation opponent information, is transmitted to the terminal at predetermined time intervals (for example, about 10 seconds) and is provided to the terminal (S505).

The information that is extracted in real-time in Operation S502, is log-stored (S511), and if log-inquiry of the information is requested from the terminal A (20A) or the terminal B (20B) after the telephone conversation is finished and one among the "Talk! talk" search menu corresponding to the main keyword information, the To-do list menu corresponding to the To-do list information and the interest list menu corresponding to the interest list information (S513), information corresponding to the selected menu is matched with the telephone conversation opponent information and is provided to the terminal (S515).

In the current embodiment, log-storing is a procedure in which the caller, information regarding the caller's matter of interest extracted from content of the real-time telephone conversation, and a telephone conversation date are matched with each other and are stored.

According to another embodiment of the present invention, all elements 31, 33 and 35 of the server 30 implemented as described above with reference to FIG. 3 may be implemented in the same manner within the user terminal 20A or 20B of FIG. 2. In this case, the method according to the first embodiment described above with reference to FIGS. 4 and 5 may be performed using only a single configuration of the user terminal 20A or 20B having a function of the server 30 without the server 30.

Hereinafter, for convenience of explanation, a service according to the first embodiment of the present invention is referred to as so-called 'Mindtalk'.

FIG. 6 illustrates a display screen of main keyword information at the user terminals 20A and 20B, according to a first embodiment of the present invention. (a) of FIG. 6 illustrates an example of a screen when a "Talk! talk" search menu is selected while talking over the telephone, and (b) of FIG. 6 illustrates an example of a screen when the "Talk! talk" search menu is selected after the telephone conversation is finished.

Mindtalk may be executed while talking over the telephone, as illustrated in (a) of FIG. 6. As illustrated in (b) of FIG. 6, all functions of Mindtalk may be used in a state in which Mindtalk is not closed even after the telephone conversation is finished. However, no data are updated according to an interest list, main keywords, and a To-do list because the exchanged voice is not present after the telephone conversation is finished. If a button 'call again' is pressed after the telephone conversation is finished, the telephone conversation is connected to a telephone conversation opponent, and a new telephone conversation log is added to a current Mindtalk log (no additional log generation).

In FIG. 6, a region B represents a title bar region. The title bar region is configured of Mindtalk with OOO (name), and a name varies fluidly according to the telephone conversation opponent. A Mindtalk closing button means that Mindtalk execution is finished, and even if the Mindtalk closing button is selected, the telephone conversation is not finished.

A region C of FIG. 6 represents an action bar region. The action bar region is configured of menus, such as an interest list menu, a "Talk! talk" search menu, and a To-do menu, and the "Talk! talk" search menu is a main menu. When a particular menu is selected, a bottom outline appears below the selected menu and shows that the selected menu is being executed.

A region D of FIG. 6 is a region in which telephone conversation main keywords (information) are displayed. Display update (this varies according to theme, such as generation, deletion, order, and size) of the keywords may be performed in a predetermined period of 10 seconds, and the keywords may be provided according to thema, such as tag cloud, a real-time ranking type, and a brain structure. When a particular keyword is clicked, web surfing may be performed, and when the particular keyword is tapped long, the keyword may be deleted, and exposure limitation words may be added/corrected/deleted to/into/from the keyword at a word filter 'Mindtalk App>Settings>Representative Keyword'. For example, maximum 30 keywords may be exposed.

A region E of FIG. 6 represents a keyword combination search window. Keywords are dragged and dropped from telephone conversation main keywords onto a search window, and one or more keywords may be combined/sorted and may be searched. When a keyword combination blank is tapped long, a new keyword input window may be generated. The keywords on the keyword window may be deleted or edited/corrected.

A region F of FIG. 6 represents a telephone conversation menu. As illustrated in (a) of FIG. 6, menus, such as a speaker phone, screen conversion, call finish, may be displayed while talking over the telephone, and as illustrated in (b) of FIG. 6, after the telephone conversation is finished, menus, such as a VoLTE call and a video call, may be displayed.

FIG. 7 illustrates a display screen of interest list information at the user terminal, according to a first embodiment of the present invention.

A region C of FIG. 7 represents an action bar region. When an interest list menu is selected, a bottom outline appears below the interest list menu and shows that the interest list menu is being executed.

A region D of FIG. 7 represents a keyword (that is the interest list information) and associated search word region. As illustrated in (a) of FIG. 7, keywords are keywords exposed within "Talk! talk" search, and if the keywords are selected, a search word list relating to the keywords is provided, and if an associated search word sentence is selected, a web browser is executed, and the result of searching the associated search word is provided to the screen, as illustrated in (b) of FIG. 7. The keywords may be deleted.

FIG. 8 illustrates a To-do list information display screen at the user terminal, according to a first embodiment of the present invention.

A region D of FIG. 8 is a region in which an action button appears. Various App buttons relating to the To-do list information are aligned in the region D, and other buttons that are covered may be checked through flicking. Other action buttons may be added/deleted by pressing a + (plus) button. If the action button is scrolled down to 'To-do list based on content of telephone conversation' through dropping and dragging and is scrolled up to particular one, the + button is covered with an action button image, and the function of the action button is executed. For example, if a memo button is dropped and dragged up to 'please make a reservation of a restaurant near the Kangnam subway station', an OEM memo is executed, an 'please make a reservation of a restaurant near the Kangnam subway station' is automatically input. Alternatively, if an address book button is dropped and dragged up to '010-8080-4038', an OEM address book is executed, and the above numbers are stored. Alternatively, if a button 'Ticket planet' (App) is dropped and dragged up to 'please make a reservation of a movie ticket for Saturday', Ticket planet is executed.

A region E of FIG. 8 is a region in which the To-do list information based on content of the telephone conversation is displayed. For example, the To-do list information based on content of the telephone conversation may be configured of a checkbox, To-do sentences, and a + button. When the To-do list information based on content of the telephone conversation is a To-do list extracted from voice of content of the telephone conversation and a command type sentence/a request type sentence/particular words (for example, to do~, must do~, let's do~, prepare, share, and the like) are mentioned during the telephone conversation, the sentence is converted into a text and is shown as the text. A keyword may be added/corrected/deleted to/into/from a particular word. When the checkbox in front of the text is selected, a To-do text may be deleted from the To-do list.

Figure 9:
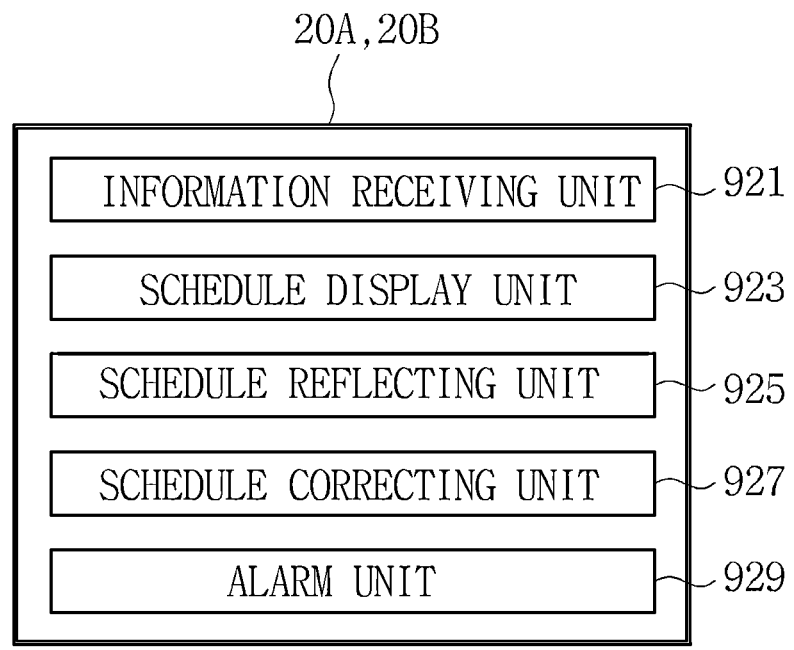
FIG. 9 illustrates a configuration of a terminal for actively providing information based on communication contents according to a second embodiment of the present invention.

FIG. 9 illustrates a configuration of a terminal for actively providing information based on communication contents according to a second embodiment of the present invention. FIG. 9 illustrates an example of a detailed configuration of the terminal A (20A) or the terminal B (20B) of FIG. 1. As illustrated in FIG. 9, the terminal for actively providing information based on communication contents according to the second embodiment of the present invention may include an information receiving unit 921, a schedule display unit 923, a schedule reflecting unit 925, a schedule correcting unit 927, and an alarm unit 929.

The information receiving unit 921 receives schedule-related information that is extracted from content of a telephone conversation of at least one of a user (subscriber) himself/herself and an opponent from the server 30 during communication or after communication is finished. A time when the schedule-related information is received, may be selected by a user, or the schedule-related information may be automatically received by the information receiving unit 921.

In the current embodiment, the schedule-related information may include at least one selected from a group including a time, a place, and an occasion (or an event).

Figure 13:
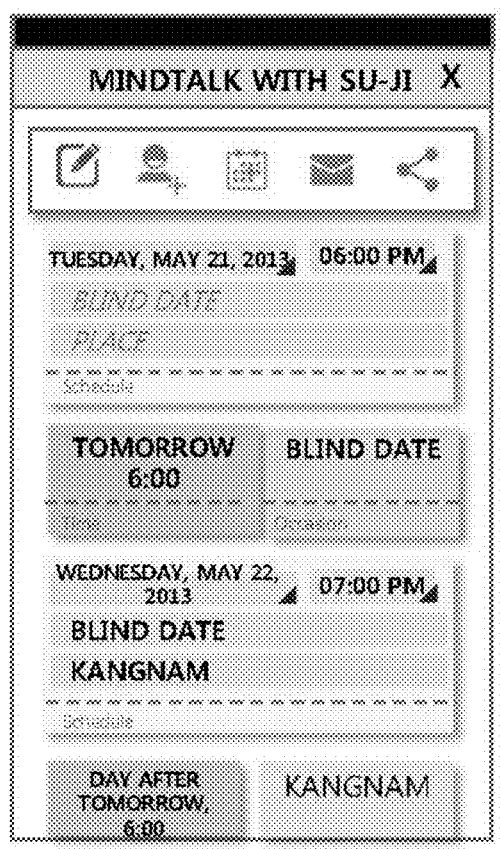
FIG. 13 illustrates an example of schedule-related information displayed on a screen of the terminal, according to a second embodiment of the present invention.

The schedule display unit 923 sorts the schedule-related information received by the information receiving unit 921 in the order of a saying time, matches the sorted schedule-related information with subscriber's communication opponent information and displays the result of matching on a screen. For example, as illustrated in FIG. 13, the communication opponent information may be displayed on a top end of the screen, like 'MindTalk with Su-ji', and App icons that enable the user to use various associated Apps (schedule, alarm, memo, and message) may be displayed below the top end of the screen, and time (date information, time information), a place name (Kangnam subway station), and an occa-sion (event) name (blind date) may be displayed as the received schedule-related information.

For example, "based on today (5/20)+1 day=May, 21, 6:00 pm=6:00 pm" as time information, "place name=Kangnam subway station" as place information, and "let's meet->meeting" as an occasion name, may be extracted from communication contents, such as 'let's meet at Kangnam subway station, Tomorrow 6:00 pm', and may be displayed. Extracting of the schedule-related information is not limited to performing by the server 30 and may also be performed by the terminal.

The schedule reflecting unit 925 may reflect the schedule-related information displayed on the screen using the schedule display unit 923, as described above, on a schedule and may store the reflected schedule-related information. For example, the schedule reflecting unit 925 may reflect the schedule-related information of which a particular button is selected by the user or which is automatically sorted and displayed, on a schedule App or memo App at the terminal and may store the reflected schedule-related information.

The schedule correcting unit 927 may edit or correct the schedule-related information displayed on the screen using the schedule display unit 923, as described above, according to user's selection. For example, if, as illustrated in (a) of FIG. 14, when a blank 'place' is selected, keywords (Kangnam subway station, Shinchon, etc.) extracted in regard to a place are sorted and displayed in the latest saying order and 'Kangnam subway station' is selected, as illustrated in (b) of FIG. 14, Kangnam subway station may be automatically input to the blank 'place'. Although information regarding date and time and the schedule name may be edited or corrected in the above-described manner, embodiments of the present invention are not limited thereto, and the information may also be edited/corrected using a method of directly inputting a text to a blank.

When the schedule-related information stored by the schedule reflecting unit 925 overlaps with the stored schedule information, the alarm unit 929 provides an alarm for an overlapping schedule. The user may check from the alarm unit 929 whether the schedule is repeated or not, and after the repeated schedule information is edited or corrected by the schedule correcting unit 927, the schedule information may be stored again using the schedule reflecting unit 925.

Figure 10:
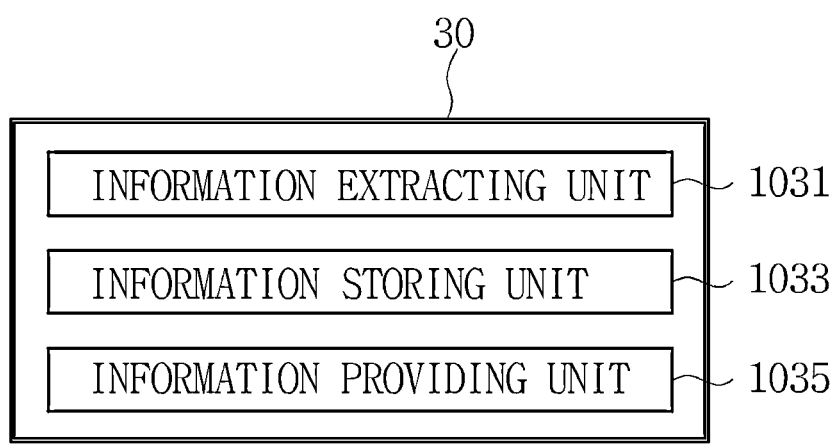
FIG. 10 illustrates a configuration of a server for actively providing information based on communication contents according to a second embodiment of the present invention.

FIG. 10 illustrates a configuration of a server for actively providing information based on communication contents according to a second embodiment of the present invention. FIG. 10 illustrates an example of a detailed configuration of the server 30 of FIG. 1. As illustrated in FIG. 10, the server for actively providing information based on communication contents according to the second embodiment of the present invention may include an information extracting unit 1031, an information storing unit 1033, and an information providing unit 1035.

The information extracting unit 1031 extracts various pieces of information including schedule-related information based on communication contents. For example, the information extracting unit 1031 may extract words or sentences relating to time, a place name, or an occasion (or event) name as the schedule-related information from the communication contents during the subscriber's communication.

For example, the information extracting unit 1031 may extract "based on today (5/20)+1 day=May, 21, 6:00 pm=6:00 pm" as time information, "place name=Kangnam subway station" as place information, and "let's meet->meeting" as an occasion name from communication contents, such as 'let's meet at Kangnam subway station, Tomorrow 6:00 pm'.

For example, when the user of the terminal B (20B) who is a telephone conversation opponent with respect to the subscriber terminal A (20A) that is one side among sending/receiving side callers is not a service subscriber according to the current embodiment, the information extracting unit 1031 may extract the schedule-related information by analyzing only content of voice conversation of the user of the subscriber terminal A (20A). In contrast, when the user of the terminal B (20B) who is a telephone conversation opponent with respect to the subscriber terminal A (20A) is also a service subscriber according to the current embodiment, the information extracting unit 1031 may extract the caller's schedule-related information by simultaneously analyzing content of voice conversation of the user of the subscriber terminal A (20A) and content of voice conversation of the user of the subscriber terminal B (20B).

The information storing unit 1033 that log-stores the schedule-related information extracted by the information extracting unit 1031 and may be configured of an additional cloud server.

The information providing unit 1035 provides the schedule-related information that is extracted by the information extracting unit 1031 in real-time or that is log-stored by the information storing unit 1033, to the terminal according to the user's selection or automatically. For example, the information providing unit 1035 may match the schedule-related information extracted from real-time content of the telephone conversation while talking over the telephone with telephone conversation opponent information at predetermined time intervals while talking over the telephone and may provide the result of matching to the terminal. Alternatively, the information providing unit 1035 may match the schedule-related information that is log-stored by the information storing unit 1033 after the telephone conversation is finished, with the telephone conversation opponent information and may provide the result of matching to the terminal.

Figure 11:
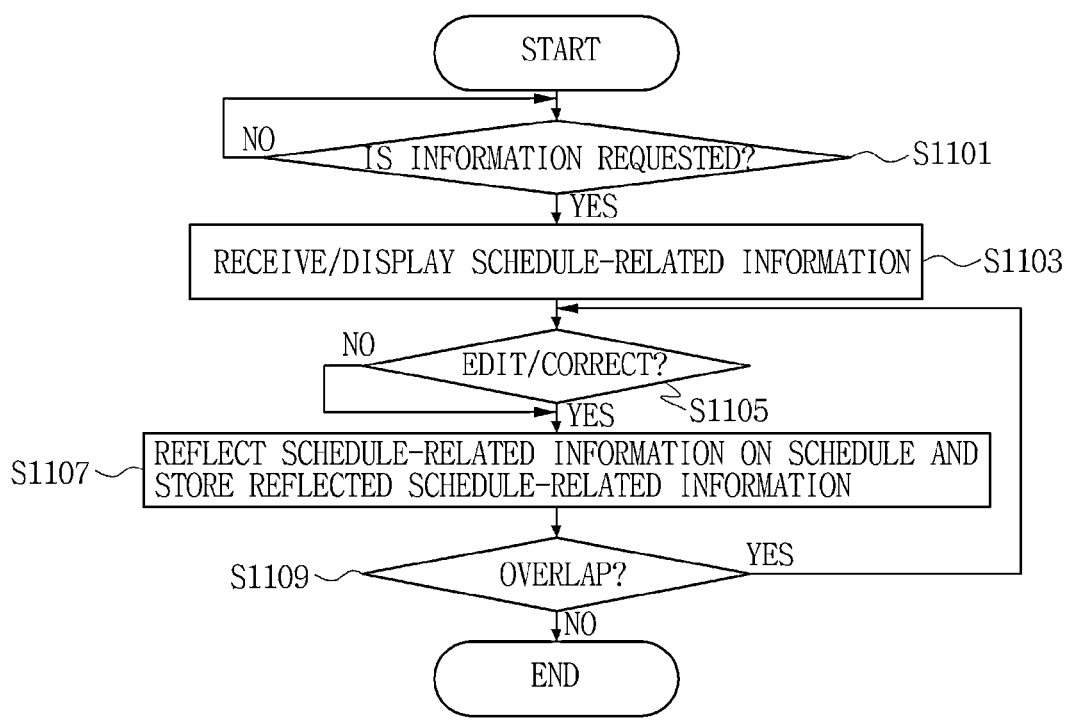
FIG. 11 is a flowchart illustrating a method for actively providing information based on communication contents, the method being performed by a terminal, according to a second embodiment of the present invention.

FIG. 11 is a flowchart illustrating a method for actively providing information based on communication contents, the method being performed by a terminal, according to a second embodiment of the present invention. The method for actively providing information based on communication contents according to the second embodiment of the present invention illustrated in FIG. 11 is applied to the terminal A (20A) or the terminal B (20B) of FIGS. 1 and 9 and thus will be described by describing operations of the terminal A (20A) and the terminal B (20B) together.

First, the information receiving unit 921 requests the schedule-related information from the server 30 according to the user's selection during communication with an opponent terminal or after communication is finished (S1101) and receives the schedule-related information from the server 30, and the schedule display unit 923 displays the received schedule-related information on the screen, as illustrated in FIG. 13 (S1103).

The schedule correcting unit 927 determines whether the schedule-related information displayed on the screen using the schedule display unit 923 in Operation S1103 is corrected or edited according to the user's selection, as described with reference to (a) and (b) of FIG. 14, and if the schedule-related information is corrected/edited by the user, the schedule correcting unit 927 performs a correcting/editing operation (S1105).

Subsequently, the schedule reflecting unit 925 reflects the schedule-related information displayed on the screen in Operation S1103 on an App relating to the schedule, such as an occasion/schedule App or a memo App, according to the user's selection or automatically and stores the reflected schedule-related information. If it is determined in Operation S1105 that the schedule-related information is corrected or edited by the schedule correcting unit 925, the schedule reflecting unit 925 reflects the corrected or edited schedule-related information on an associated App of the terminal and stores the reflected schedule-related information. If it is determined in Operation S1105 that the schedule-related information is not corrected or edited, the schedule reflecting unit 925 reflects the schedule-related information displayed on the screen in Operation S1103 on the associated App of the terminal and stores the reflected schedule-related information (S1107).

Also, the alarm unit 929 checks whether the schedule(-related) information stored in the associated App using the schedule reflecting unit 925 in Operation S1107 overlaps with at least one of time, place, and an occasion name (S1109). If the schedule(-related) information overlaps with at least one of time, place, and an occasion name, the alarm unit 929 informs the user of overlapping information and then the method goes back to Operation S1105, the schedule-related information is corrected/edited and is stored again, and if the schedule(-related) information overlaps with at least one of time, place, and an occasion name, the method is ended (S1109).

If the user searches the occasion/schedule App for a schedule of a particular date, the schedule display unit 2323, the whole schedule list of the date may be sorted in a time sequence together with information of a communication opponent and may be displayed, as illustrated in FIG. 15.

Figure 12:
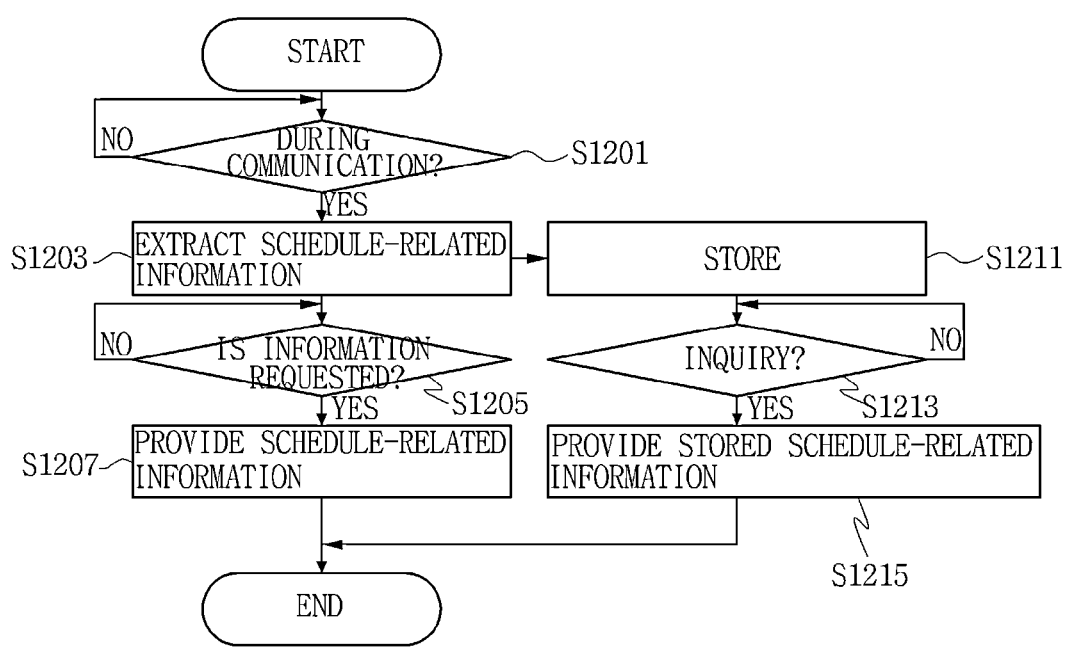
FIG. 12 is a flowchart illustrating a method for actively providing information based on communication contents, the method being performed by a server, according to a second embodiment of the present invention.

FIG. 12 is a flowchart illustrating a method for actively providing information based on communication contents, the method being performed by a server, according to a second embodiment of the present invention. The method for actively providing information based on communication contents illustrated in FIG. 12 is applied to the server 30 of FIGS. 1 and 10 and thus will be described by describing the operation of the server 30.

First, if communication (voice communication or message communication) between the terminal A (20A) and the terminal B (20B) start (S1201), schedule-related information is extracted from communication contents of one or both of the terminal A (20A) and the terminal B (20B) in real-time (S1203).

Subsequently, it is determined whether the schedule-related information is requested from the terminal A (20A) or the terminal B (20B) (S1205), and if it is determined in Operation S1205 that the schedule-related information is requested from the terminal A (20A) or the terminal B (20B), the schedule-related information extracted in Operation S1203 is matched with communication opponent information according to a predetermined period or in real-time, and the result of matching is provided to the terminal (S1207).

The schedule-related information extracted in real-time in Operation S1203 is log-stored (S1211), and if, after a telephone conversation is finished, the user logs in the terminal A (20A) or the terminal B (20B) and there is a request for an inquiry of the schedule-related information (S1213), the stored schedule-related information is matched with the communication opponent information and is provided to the terminal (S1215).

According to another embodiment of the present invention, all elements 1031, 1033, and 1035 of the server 30 implemented described with reference to FIG. 10 may be implemented in the same manner within the user terminal 20A or 20B of FIG. 9. In this case, the method according to the second embodiment described above with reference to FIGS. 11 and 12 may be performed using only a single configuration of the user terminal 20A or 20B having a function of the server 30 without the server 30.

Figure 16:
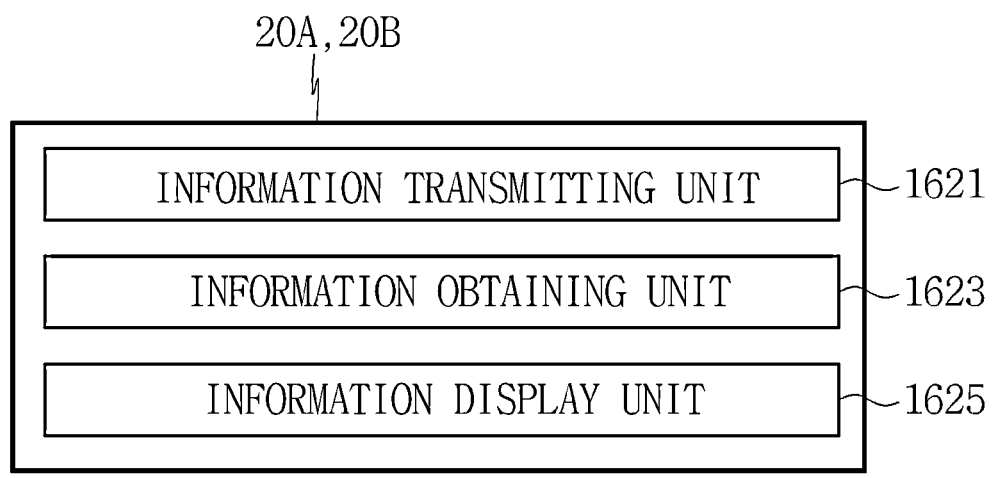
FIG. 16 illustrates a configuration of a terminal for actively providing information based on communication contents according to a third embodiment of the present invention.

FIG. 16 illustrates a configuration of a terminal for actively providing information based on communication contents according to a third embodiment of the present invention. FIG. 16 illustrates an example of a detailed configuration of the terminal A (20A) or the terminal B (20B) of FIG. 1. As illustrated in FIG. 16, the terminal for actively providing information based on communication contents according to a third embodiment of the present invention may include an information transmitting unit 1621, an information obtaining unit 1623, and an information display unit 1625.

The information transmitting unit 1621 transmits name information stored in a subscriber (terminal) address book to the server 30 when the user's (subscriber's) communication is performed. For example, if a sending call or a receiving call starts, the information transmitting unit 1621 extracts name information, such as friends, family, and coworkers, stored in the address book and transmits the extracted name information to the server 30.

The information obtaining unit 1623 obtains the name information within the subscriber (terminal) address book extracted from communication contents of at least one of a subscriber himself/herself and a communication opponent. For example, the information obtaining unit 1623 may receive the name information within the subscriber (terminal) address book extracted from the communication contents of at least one of the user (subscriber) himself/herself or the communication opponent during communication or after communication is finished, from the server 30. A time when the name information is received, may be selected by the user, or the name information may be automatically received.

The information display unit 1625 extracts address book information corresponding to the name information obtained by the information obtaining unit 1623 from the subscriber address book and displays the result of extraction. In detail, the information display unit 1625 may extract the address book information including a name, a telephone number, and a photo, from the address book immediately after the information obtaining unit 1623 receives the name information from the server 30 and obtains the name information, and the information display unit 1625 may match the extracted address book information with the communication opponent information and may display the result of matching on the screen.

Also, the information display unit 1625 may display the address book information together with a telephone conversation connection button for sending a voice call while the displayed name is used as a receiving opponent, a message sending button for sending a message call, and a share button for transmitting the displayed address book information to another person via a desired channel and for sharing the address book information.

Figure 20:
FIG. 20 illustrates an example of a screen displayed on the terminal, according to a third embodiment of the present invention.

The information display unit 1625, as illustrated in FIG. 20, for example, may display an opponent name and telephone as the opponent information, like 'Bae Su-ji 010-8080-4038' on a top end of the screen, may display information regarding the number of persons (names) mentioned while talking over the telephone, like 'there are two persons mentioned during call' below the opponent name and telephone, may display information based on the address book, such as a profile photo, a name, and a telephone number of each of persons (names) mentioned, and may display the telephone conversation connection button, the message sending button, and the share button and may provide the above-mentioned pieces of information to the user.

Thus, the user may check the address book information, such as a name and a telephone number of an acquaintance mentioned while talking over the telephone, while talking over the telephone or immediately after the telephone conversation is finished, may immediately contact the acquaintance based on the checked information or may share the acquaintances' address book information with another person.

Figure 17:
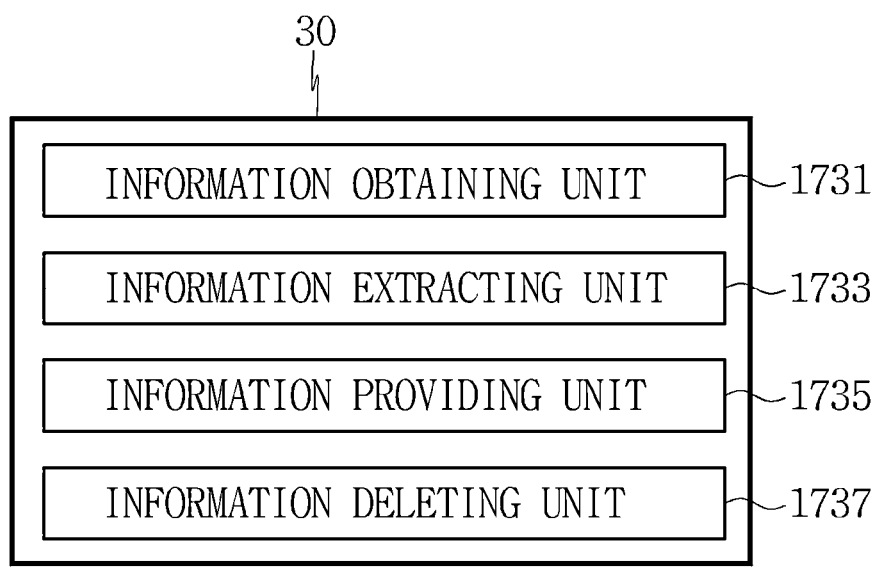
FIG. 17 illustrates a configuration of a server for actively providing information based on communication contents according to a third embodiment of the present invention.

FIG. 17 illustrates a configuration of a server for actively providing information based on communication contents according to a third embodiment of the present invention. FIG. 17 illustrates an example of a detailed configuration of the server 30 of FIG. 1. As illustrated in FIG. 17, the server 30 may include an information obtaining unit 1731, an information extracting unit 1733, an information providing unit 1735, and an information deleting unit 1737.

The information obtaining unit 1731 obtains name information within the subscriber (terminal) address book while the subscriber's communication is performed. For example, the information obtaining unit 1731 may receive/obtain the name information within the address book transmitted from the subscriber's terminal 20A or 20B when the subscriber's communication starts and may possess them.

The information extracting unit 1733 extracts the name information within the address book obtained by the information obtaining unit 1731, from the subscriber's communication contents. The information extracting unit 1733 may extract the name information, i.e., name information within the address book mentioned during communication, from the communication contents during the subscriber's communication based on the name information within the address book.

For example, if it is assumed that name information, such as 'Hyori' and 'Soohyun', are present within the address book of the subscriber who is performing communication, the information extracting unit 1733 may extract the name information 'Hyori' mentioned from communication contents, such as "I'll let you know Hyori's telephone number after the telephone conversation is finished", and may extract the name information 'Soohyun' mentioned from communication contents, such as "I'll call Soohyun".

For example, when the user of the terminal B (20B) who is a telephone conversation opponent with respect to the subscriber terminal A (20A) that is one side among sending/receiving side callers is not a service subscriber according to the current embodiment, the information extracting unit 1733 may extract the mentioned name information by analyzing only content of a voice call of the user of the subscriber terminal A (20A). In contrast, when the user of the terminal B (20B) who is a telephone conversation opponent with respect to the subscriber terminal A (20A) is also a service subscriber according to the current embodiment, the information extracting unit 1733 may extract the mentioned name information by simultaneously analyzing both content of the voice call of the user of the subscriber terminal A (20A) and content of a voice call of the user of the subscriber terminal B (20B).

The information providing unit 1735 that provides the name information extracted by the information extracting unit 1733 to the subscriber's terminal 20A or 20B may provide the name information to the terminal according to selection of the user of the subscriber terminal A (20A) or B (20B) or automatically.

For example, the information providing unit 1735 may match the name information extracted from content of a real-time telephone conversation while talking over the telephone with telephone conversation opponent information and may provide the result of matching. Alternatively, the information providing unit 1735 may match the name information stored after the telephone conversation is finished, with the telephone conversation opponent information according to the user's selection or automatically and may provide the result of matching. A time when the result of matching is provided, is not limited thereto and may be modified in various ways.

The information deleting unit 1737 is selectively provided and deletes the name information obtained by the information obtaining unit 1731 when the subscriber's communication is finished. For example, the information deleting unit 1737 may obtain the name information within the subscriber's address book using the information obtaining unit 1731 when the subscriber's call starts and may possess them, and if the telephone conversation is finished, the information deleting unit 1737 may delete the possessing name information so that a storage load of the server 30 can be reduced.

Figure 18:
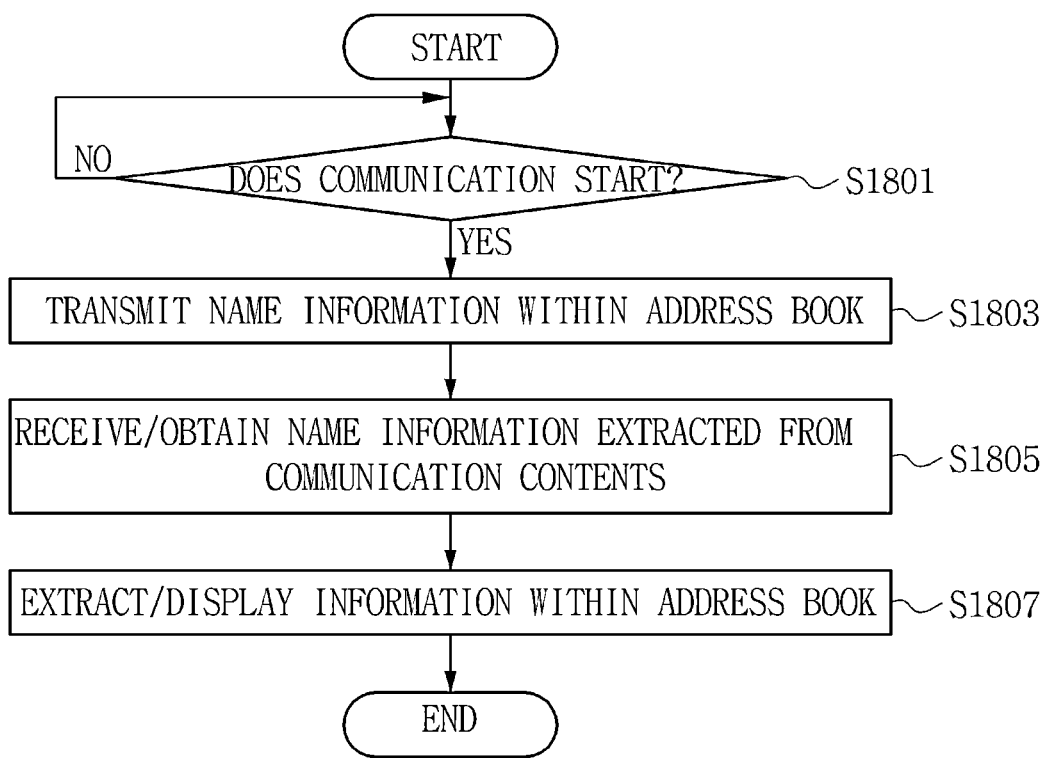
FIG. 18 is a flowchart illustrating a method for actively providing information based on communication contents, the method being performed by the terminal, according to a third embodiment of the present invention.

FIG. 18 is a flowchart illustrating a method for actively providing information based on communication contents, the method being performed by the terminal, according to a third embodiment of the present invention. The method for actively providing information based on communication contents according to the third embodiment of the present invention illustrated in FIG. 18 is applied to the terminal A (20A) or the terminal B (20B) of FIGS. 1 and 16 and thus will be described while operations of the terminal A (20A) and the terminal B (20B).

First, if a communication with an opponent terminal starts (S1801), the information transmitting unit 1621 extracts name information stored in the subscriber's address book, transmits the extracted name information to the server 30 and requests voice recognition of communication contents (S1803).

Subsequently, the information obtaining unit 1623 receives the name information extracted from the communication contents, i.e., name information within the address book mentioned during communication, from the server 30 and obtains the received name information (S1805).

Last, the information display unit 1626 extracts address book information corresponding to the name information obtained by the information obtaining unit 1623 from the address book, matches the extracted address book information with the subscriber's communication opponent information and displays the result of matching on the screen. For example, as illustrated in FIG. 20, the information display unit 1623 may extract the address book information including a name, a telephone number, and a photo of a person after the name information (name information of a person within the address book mentioned while talking over the telephone) is received from the server 30 and is obtained, may match the extracted address book information with the subscriber's communication opponent information using various communication buttons (a telephone conversation connection button, a message sending button, and a share button) for communicating with the person, and may display the result of matching on the screen (S1807).

Figure 19:
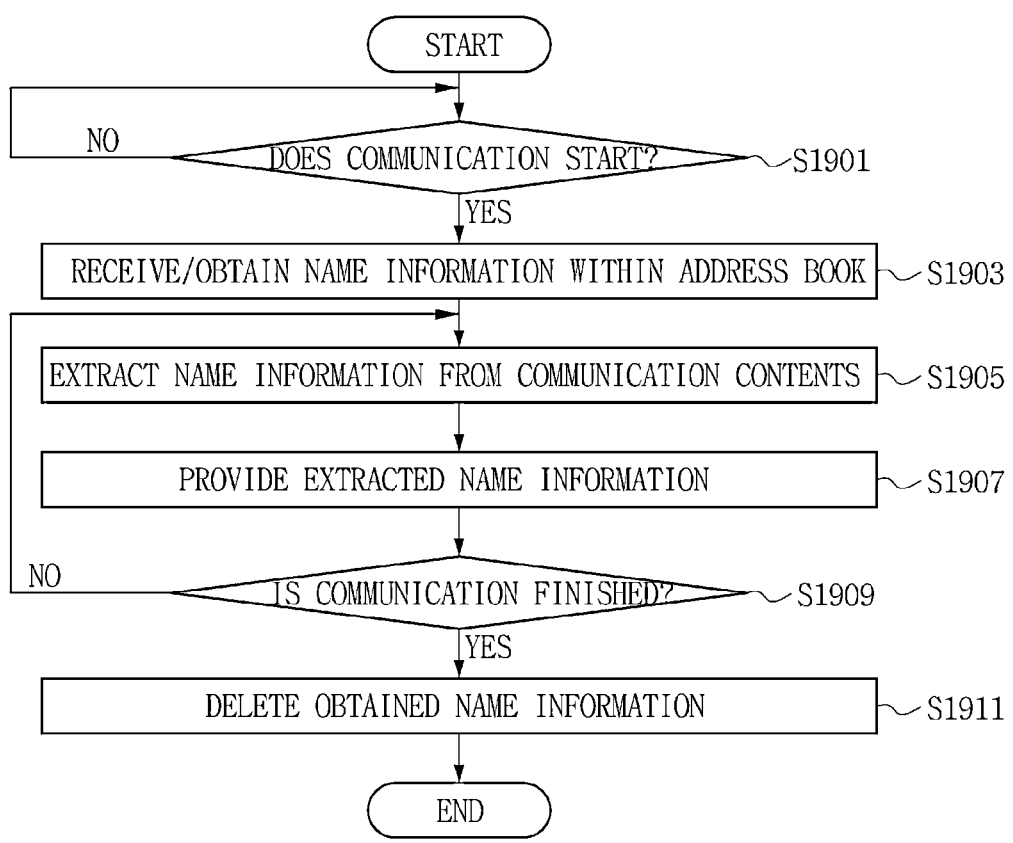
FIG. 19 is a flowchart illustrating a method for actively providing information based on communication contents, the method being performed by the server, according to a third embodiment of the present invention.

FIG. 19 is a flowchart illustrating a method for actively providing information based on communication contents, the method being performed by the server, according to a third embodiment of the present invention. The method for actively providing information based on communication contents according to the third embodiment of FIG. 19 is applied to the server 30 of FIGS. 1 and 17 and thus will be described by describing the operation of the server 30.

First, if communication (voice, message, or SNS) between the terminal A (20A) and the terminal B (20B) starts, the information obtaining unit 1731 receives name information within the subscriber (terminal) address book transmitted from the information transmitting unit 1621 of the subscriber terminal 20A and/or 20B (S1903).

Subsequently, the information extracting unit 1733 extracts name information within the address book mentioned while talking over the telephone from communication contents of one or both of the terminal A (20A) and the terminal B (20B) based on the name information within the address book received in Operation S1903 (S1905).

Subsequently, the information providing unit 1735 matches the name information extracted by the information extracting unit 1733 in Operation S1905 with the communication opponent information according to a request of the information of the subscriber terminal 20A and/or 20B or a predetermined period or in real-time and transmits and provides the result of matching to the subscriber terminal 20A and/or 20B (S1907).

When the subscriber's communication started in Operation S1901 is finished (S1909), the information deleting unit 1737 may delete the name information obtained by the information obtaining unit 1731 (S1911).

Figure 21:
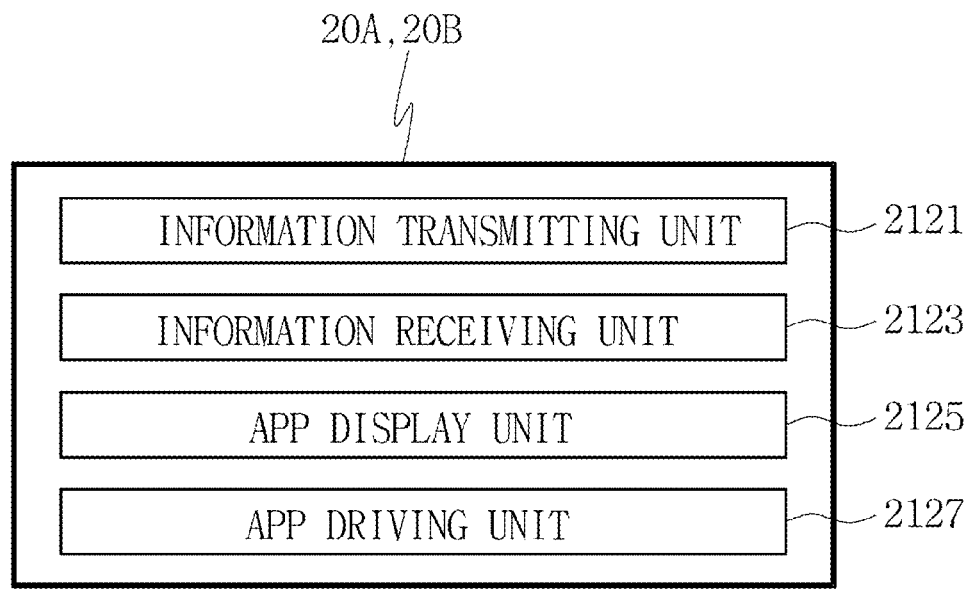
FIG. 21 illustrates a configuration of a terminal for actively providing information based on communication contents, according to a fourth embodiment of the present invention.

FIG. 21 illustrates a configuration of a terminal for actively providing information based on communication contents, according to a fourth embodiment of the present invention. FIG. 21 illustrates an example of a detailed configuration of the terminal A (20A) or the terminal B (20B) of FIG. 1. As illustrated in FIG. 21, the terminal for actively providing information based on communication contents, according to the fourth embodiment of the present invention may include an information transmitting unit 2121, an information receiving unit 2123, an App display unit 2125, and an App driving unit 2127.

The information transmitting unit 2121 transmits information regarding Apps installed within a subscriber terminal to the server 30 when the user's (subscriber's) communication is performed or in advance. For example, if a sending call or a receiving call starts, the information transmitting unit 2121 may extract information regarding a list of Apps installed within the subscriber terminal and may transmit the extracted information regarding the list of Apps to the server 30. Alternatively, the information transmitting unit 2121 may extract information regarding a list of Apps installed within the terminal during communication or in advance (for example, when changes are present in installation of Apps within the subscriber terminal) and may transmit the extracted information regarding the list of Apps to the server 30.

Also, the information transmitting unit 2121 may record communication contents in real-time and may transmit a voice file in which the communication contents are recorded, to the server 30.

The information receiving unit 2123 receives first information relating to the Apps within the subscriber terminal extracted from communication contents of at least of a subscriber himself/herself and a communication opponent or second information regarding one or more App driving icons corresponding to the first information from the server 30. For example, the information receiving unit 2123 may receive first information relating to Apps extracted from the communication contents of at least one of a user (subscriber) himself/herself and an opponent during communication or after communication is finished, or second information regarding to App driving icons from the server 30 and may obtain the first information or the second information. A time when the first and second information are received, may be selected by the user, and the first and second information may be automatically received.

The App display unit 2125 displays words/sentences of the first information relating to Apps obtained by the information receiving unit 2123 or App driving icons of the second information regarding App driving icons on the screen. For example, the App display unit 2125 may display the words/sentences or the App driving icons with the subscriber's communication opponent information immediately after the information receiving unit 2123 receives the first and second information from the server 30 and may display the result of matching on the screen.

Figure 25:
FIG. 25 illustrates an example of a screen displayed on the terminal, according to a fourth embodiment of the present invention.

The App display unit 2125, for example, as illustrated in FIG. 25, may display an opponent name and telephone number as the communication opponent information, like 'Bae Su-ji 010-8080-4038' on a top end of the screen, may display "I'll send a message to you after the telephone conversation is finished" as content of a telephone conversation, i.e., first information relating to Apps installed within the user (subscriber) terminal, below 'Bae Su-ji 010-8080-4038' on the screen in a dotted box, and may display an SMS/MMS message icon and a Kakaotalk™ icon for sending messages as the App driving icons corresponding to the content of the telephone conversation (first information).

The App driving unit 2127 drives (executes) an App when the App driving icons displayed by the App display unit 2125 are selected. For example, when the words/sentences corresponding to information regarding to Apps mentioned while talking over the telephone, App driving icons are displayed on the screen using the App display unit 2125 while talking over the telephone or after the telephone conversation is finished, and the user selects a necessary App, the App driving unit 2127 may drive the App immediately.

Figure 22:
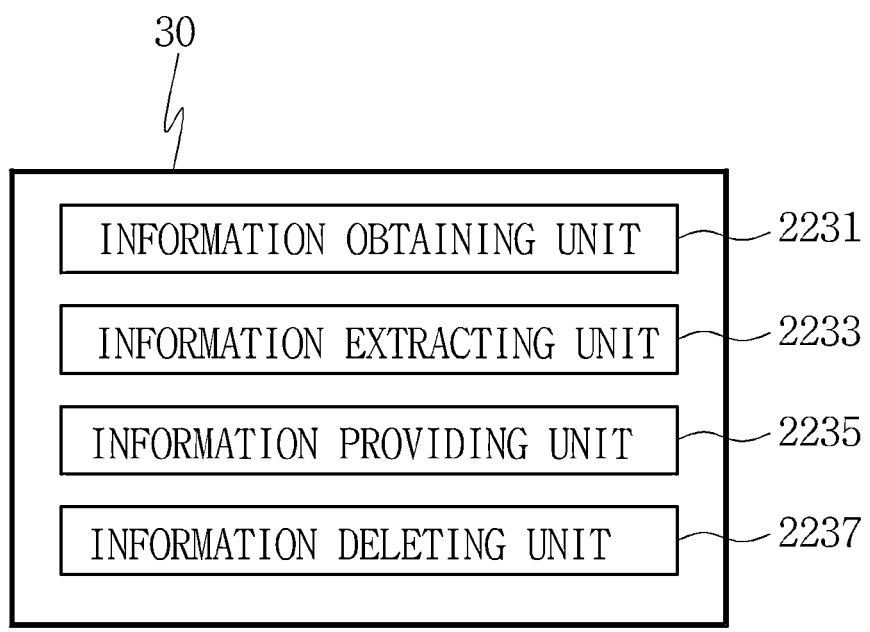
FIG. 22 illustrates a configuration of a server for actively providing information based on communication contents, according to a fourth embodiment of the present invention.

FIG. 22 illustrates a configuration of a server for actively providing information based on communication contents, according to a fourth embodiment of the present invention. FIG. 22 illustrates an example of a detailed configuration of the server 30 of FIG. 1. As illustrated in FIG. 22, the server for actively providing information based on communication contents according to the fourth embodiment of the present invention may include an information obtaining unit 2231, an information extracting unit 2233, an information providing unit 2235, and an information deleting unit 2237.

The information obtaining unit 2231 obtains information regarding Apps installed within the subscriber terminal when the subscriber's communication is performed. For example, when the subscriber's communication starts or in advance (for example, when changes are present in installation of Apps within the subscriber terminal), the information obtaining unit 2231 may receive/obtain the information regarding the Apps transmitted from the subscriber's terminal 20A or 20B and may possess the received/obtained information regarding the Apps.

Also, the information obtaining unit 2231 may receive and obtain a voice data file that contains communication contents that are recorded at the subscriber terminal in real-time when the subscriber's communication is performed and are transmitted.

The information extracting unit 2233 may extract first information as content of a telephone conversation relating to the App information obtained by the information obtaining unit 2231 from the subscriber's communication contents and may extract second information regarding App driving icons corresponding to the extracted first information from the obtained App information. The information extracting unit 2233 may extract App-related information, i.e., content relating to Apps mentioned during communication, from the communication contents during the subscriber's communication based on the App information (names, types, and functions) of Apps installed within the subscriber terminal.

For example, if it is assumed that an SMS/MMS messaging App, a Kakaotalk App, and other many Apps for sending messages are installed within the terminal of the subscriber who is performing communication, when a sentence "I'll send a message to you after the telephone conversation is finished" is mentioned while talking over the telephone, the information extracting unit 2233 may extract the sentence as App-related information (first information) and may extract SMS/MMS and Kakaotalk as App information (second information) for sending messages.

For example, when the user of the terminal B (20B) who is a telephone conversation opponent with respect to the subscriber terminal A (20A) that is one side among sending/receiving side callers is not a service subscriber according to the current embodiment, the information extracting unit 2233 may extract the mentioned name information by analyzing only content of a voice call of the user of the subscriber terminal A (20A). In contrast, when the user of the terminal B (20B) who is a telephone conversation opponent with respect to the subscriber terminal A (20A) is also a service subscriber according to the current embodiment, the information extracting unit 2233 may extract the mentioned name information by simultaneously analyzing both content of the voice call of the user of the subscriber terminal A (20A) and content of a voice call of the user of the subscriber terminal B (20B).

The information providing unit 2235 provides the App-related information (first information) or the App information (second information) extracted by the information extracting unit 2233 to the subscriber terminal 20A and/or 20B. The information providing unit 2235 may provide the name information to the terminal according to selection of the user of the subscriber terminal 20A and/or 20B or automatically (i.e., without receiving a user selection).

For example, the information providing unit 2235 may match the first or second information extracted from content of a real-time telephone conversation while talking over the telephone with telephone phone opponent information and may provide the result of matching to the terminal. Alternatively, the information providing unit 2235 may match the name information stored after the telephone conversation is finished, with the telephone conversation opponent information according to the user's selection or automatically and may provide the result of matching to the terminal. A time when the result of matching is provided to the terminal, is not limited thereto and may be modified in various ways.

The information deleting unit 2237 is selectively provided and deletes the App information obtained by the information obtaining unit 2231 when the subscriber's communication is finished. For example, when the subscriber's call starts, information regarding Apps installed within the subscriber terminal is obtained and possessed by the information obtaining unit 2231, and if the telephone conversation is finished, the possessed App information may be deleted by the information deleting unit 2237 so that a storage load of the server 30 can be reduced.

Figure 23:
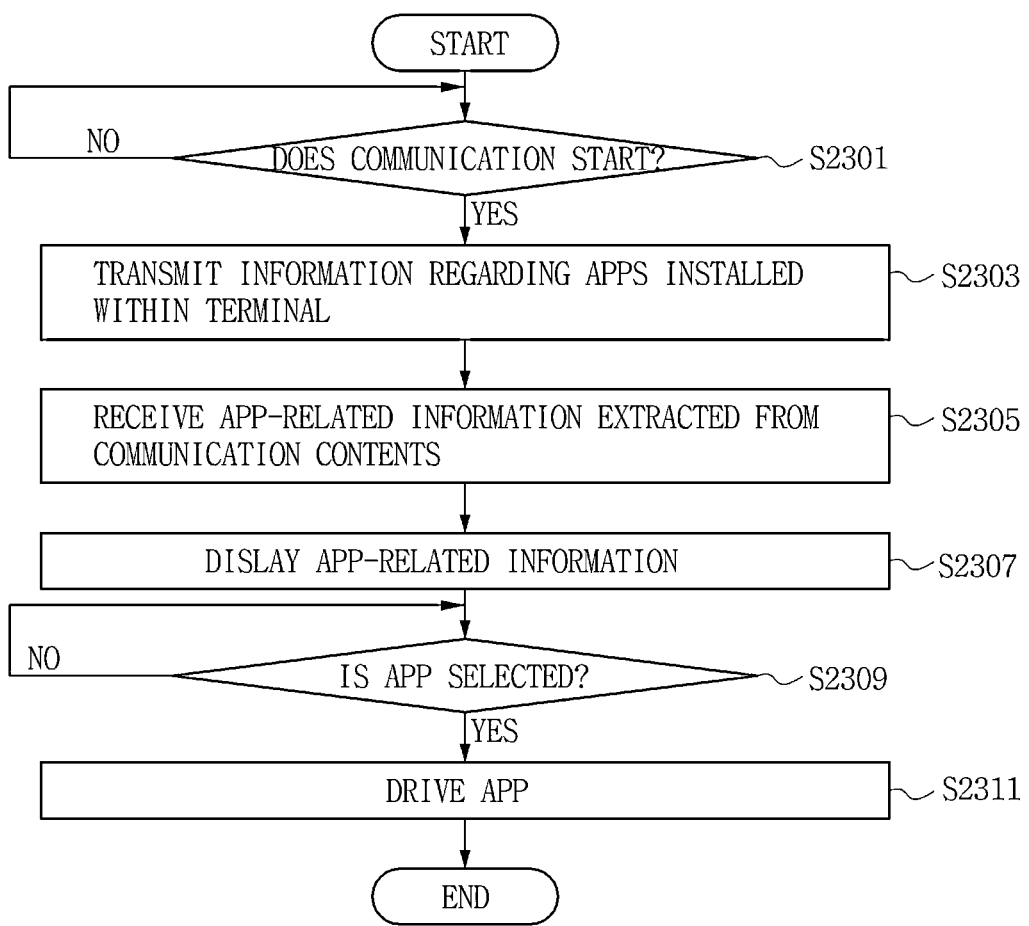
FIG. 23 is a flowchart illustrating a method for actively providing information based on communication contents, the method being performed by the terminal, according to a fourth embodiment of the present invention.

FIG. 23 is a flowchart illustrating a method for actively providing information based on communication contents, the method being performed by the terminal, according to a fourth embodiment of the present invention. The method for actively providing information based on communication contents according to the fourth embodiment of the present invention is applied to the terminal A (20A) or the terminal B (20B) of FIGS. 1 and 21 and thus will be described by describing operations of the first terminal A (20A) and the terminal B (20B).

First, if communication with an opponent terminal starts (S2301), the information transmitting unit 2121 extracts information regarding Apps (list) installed within his/her own terminal, transmits the extracted information to the server 30 and requests voice recognition of communication contents (S2303).

Subsequently, the information receiving unit 2123 receives App-related information (first information) and App driving icon information (second information extracted from the communication contents, i.e., App-related content (first information) mentioned during communication and App driving icon information (second information) for executing the App-related content, from the server 30 and obtains the pieces of information (S2305).

Subsequently, the App display unit 2125 may match content of a telephone conversation corresponding to the first information obtained by the information receiving unit 2123 and the App driving icons corresponding to the second information with the subscriber's communication opponent information and may display the result of matching on the screen. For example, as illustrated in FIG. 25, the App display unit 2124 may display an opponent name and telephone as communication opponent information, like 'Bae Su-ji 010-8080-4038' on a top end of the screen, may display "I'll send a message to you after the telephone conversation is finished" as content of the telephone conversation relating to Apps installed within his/her own terminal, i.e., first information, below 'Bae Su-ji 010-8080-4038' on the screen in a dotted box, and may display an SMS/MMS message icon and a Kakaotalk icon for sending messages as App driving icons corresponding to the content of the telephone conversation (first information) (S2307).

Last, if one is selected from the App driving icons displayed by the App display unit 2125 (S2309), the App driving unit 2127 drives the selected App (S2311).

In Operation S2303, the information transmitting unit 2121 may record the communication contents in real-time and may transmit a voice file in which the communication contents are recorded, to the server 30.

Figure 24:
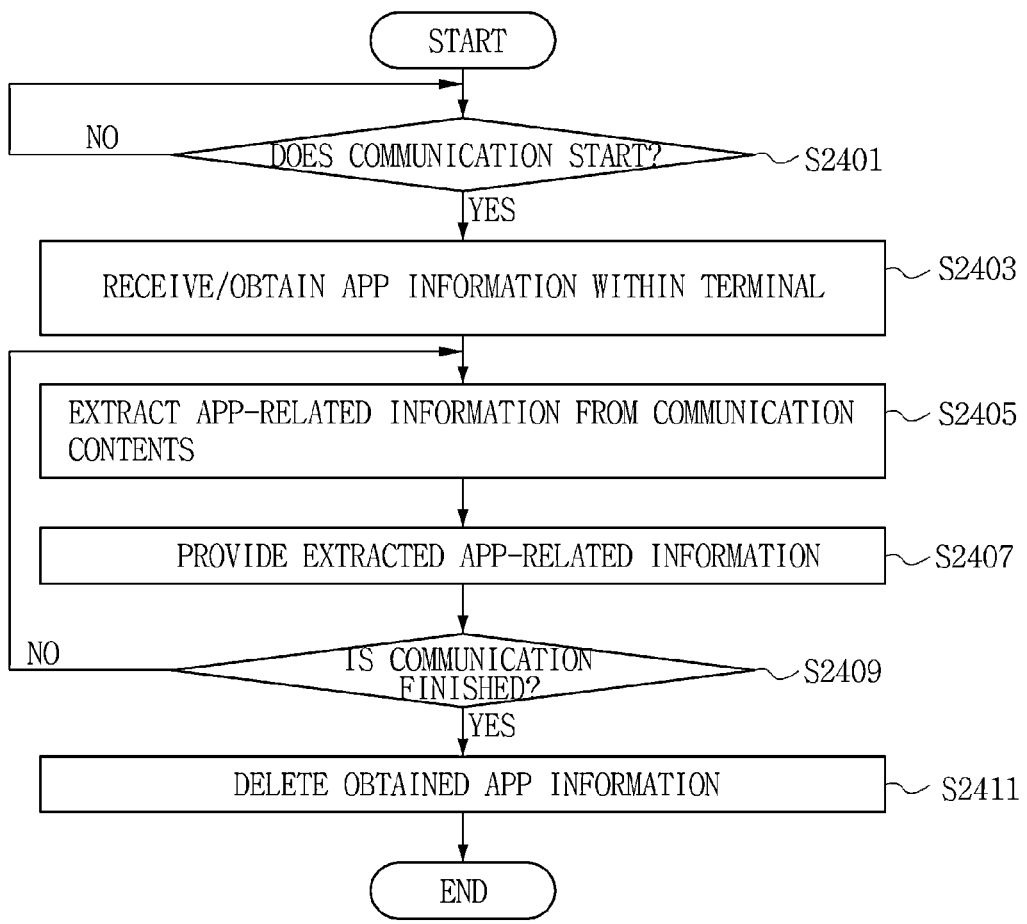
FIG. 24 is a flowchart illustrating a method for actively providing information based on communication contents, the method being performed by the server, according to a fourth embodiment of the present invention.

FIG. 24 is a flowchart illustrating a method for actively providing information based on communication contents, the method being performed by the server, according to a fourth embodiment of the present invention. The method for actively providing information based on communication contents according to the fourth embodiment of the present invention is applied to the server 30 of FIGS. 1 and 22 and thus will be described by describing the operation of the server 30.

First, if communication (voice, message, or SNS) between the terminal A (20A) and the terminal B (20B) starts, the information obtaining unit 2231 receives App information within the terminal transmitted from the information transmitting unit 2121 of the subscriber terminal 20A and/or 20B (S2403).

Subsequently, the information extracting unit 2233 extracts App-related information (first information) mentioned during communication from communication contents of one or both of the terminal A (20A) and the terminal B (20B) based on the App information received in Operation S2403 in real-time (S2405).

Subsequently, the information providing unit 2235 matches the App-related information (first information) and the App driving icon information (second information) extracted by the information extracting unit 2233 in Operation S2405 with communication opponent information according to a request of the information from the subscriber terminal 20A and/or 20B or a predetermined period or in real-time and may transmit and provide the result of matching to the subscriber terminal 20A and/or 20B (S2407).

When the subscriber's communication started in Operation S2401 is finished (S2409), the information deleting unit 2237 may selectively delete the App information obtained by the information obtaining unit 2230 (S2411).

As another example of the fourth embodiment, when App information within a terminal is not transmitted to a server but the server analyzes voice, selects App category information and passes the App category information as second information to the terminal, the terminal may display all of App icons installed if Apps corresponding to the second information are installed. For example, if 'letter' is mentioned and 'letter application' information (second information) is passed to the terminal, the terminal may display all of application driving icons if one or more applications corresponding to the 'letter application' are present, and if no application corresponding to the 'letter application' is present, the terminal may not display any application.

As another example of the fourth embodiment, the terminal may display arbitrarily-selected letter application driving icons. For example, when no application that the user wants to drive is installed, the terminal may move to an installation site (Google play) and may download and drive the application.

In the first through fourth embodiments of the present invention, the server 30 may obtain the communication contents from a communication network during the subscriber's communication or may receive a voice data file in which the communication contents are recorded in real-time and transmitted, from the subscriber terminal 20A and/or 20B.

Figure 26:
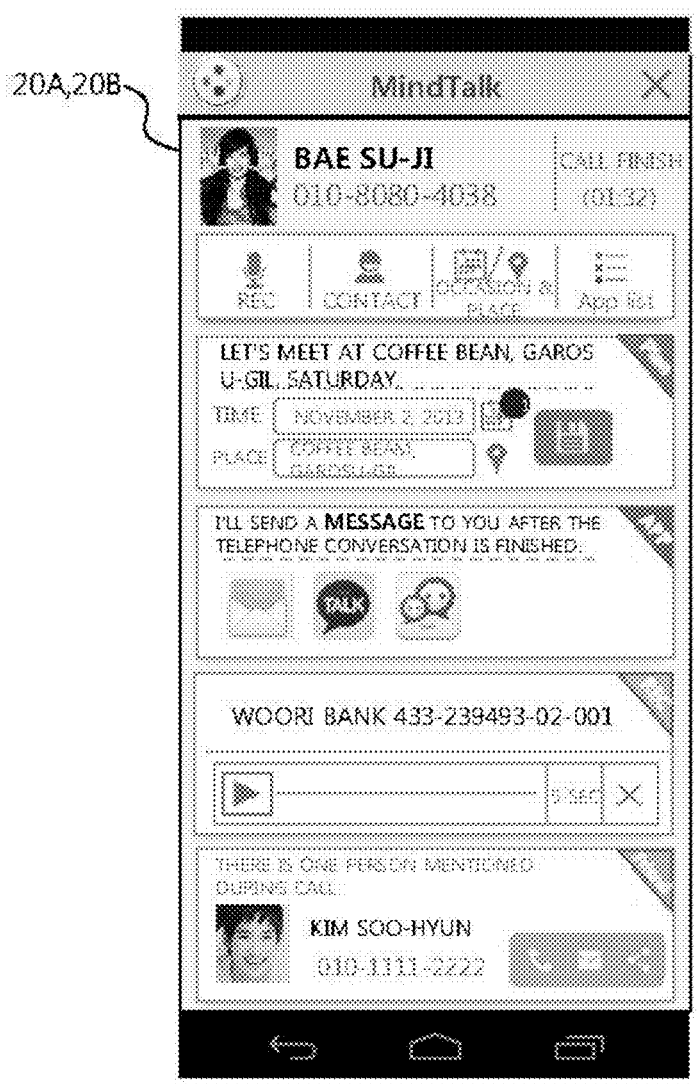
FIG. 26 illustrates an example of a user interface (UI) screen displayed on the user terminal when a service in which functions according to the first through fourth embodiments of the present invention are integrated, is provided.

FIG. 26 illustrates an example of a user interface (UI) screen displayed on the user terminal when a service in which functions according to the first through fourth embodiments of the present invention are integrated, is provided.

Referring to FIG. 26, 'MindTalk' as a service name is displayed on the uppermost end of an UI screen of the user terminal 20A or 20B, and opponent's name 'Bae Su-ji' and her telephone number '010-8080-4038' as telephone conversation opponent information is displayed below 'MinkTalk', and a REC button, a contact button, an occasion button, an App list button, and a matter-of-interest button are displayed below 'Bae Su-ji 010-8080-4038', and categories, such as Plan, App, REC, Friend, and Interest information, are made so that one or more pieces of schedule-related information mentioned while talking over the telephone, one or more pieces of App-related information, one or more pieces of REC-related information, one or more pieces of address book information, and one or more pieces of caller's interest information can be displayed according to the categories.

The above-described REC button, contact button, occasion button, App list button, and matter-of-interest button are buttons for sorting one or more pieces of information corresponding to categories of the selected button may be placed on the uppermost end of the UI screen.

Also, the above-described REC-related function is a function, whereby the user selects a desired section while talking over the telephone, records content of a telephone conversation in the desired section in his/her terminal and converts the recorded information into a text and displays the text. The REC-related function may be implemented using existing REC technology and Speech To Text (STT) technology and thus, a detailed description thereof will be omitted.

FIGS. 27 through 37 illustrate an execution screen while talking over the telephone of the user terminal according to the first embodiment of the present invention.

Figure 27:
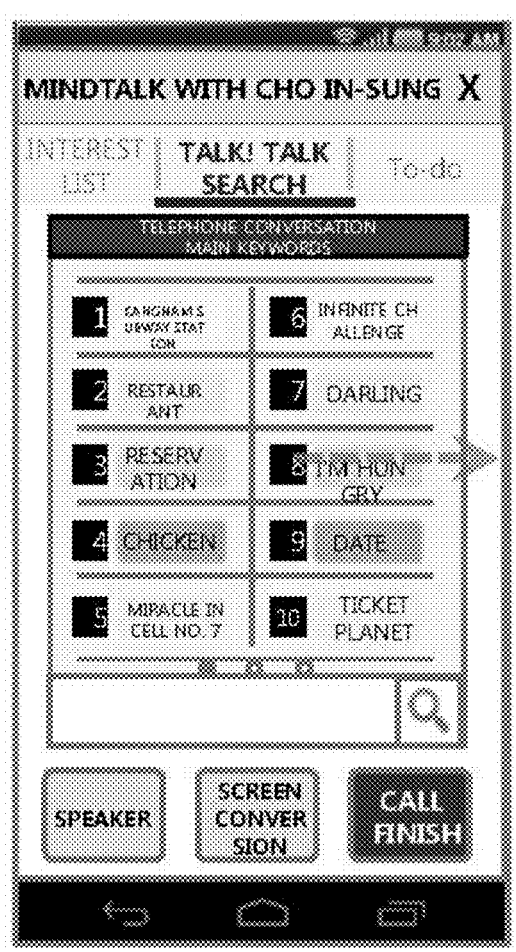

FIG. 27 illustrates an execution screen when a "Talk! talk" search menu is selected while talking over the telephone. When the telephone conversation starts, a main keyword information display region is in a blank state, and content of a telephone conversation is analyzed for 10 seconds and then, main keywords are exposed. Words, of which saying characteristics, such as the number of times being mentioned, volume size, speed, and pronunciation accuracy among content of the telephone conversation, meet with a predetermined reference, are extracted as keywords (voice recognition solution). Also, ranking is made according to the occurrence frequency and/or the number of the saying characteristics, for example, the occurrence frequency (repetition) of using words.

Figure 28:
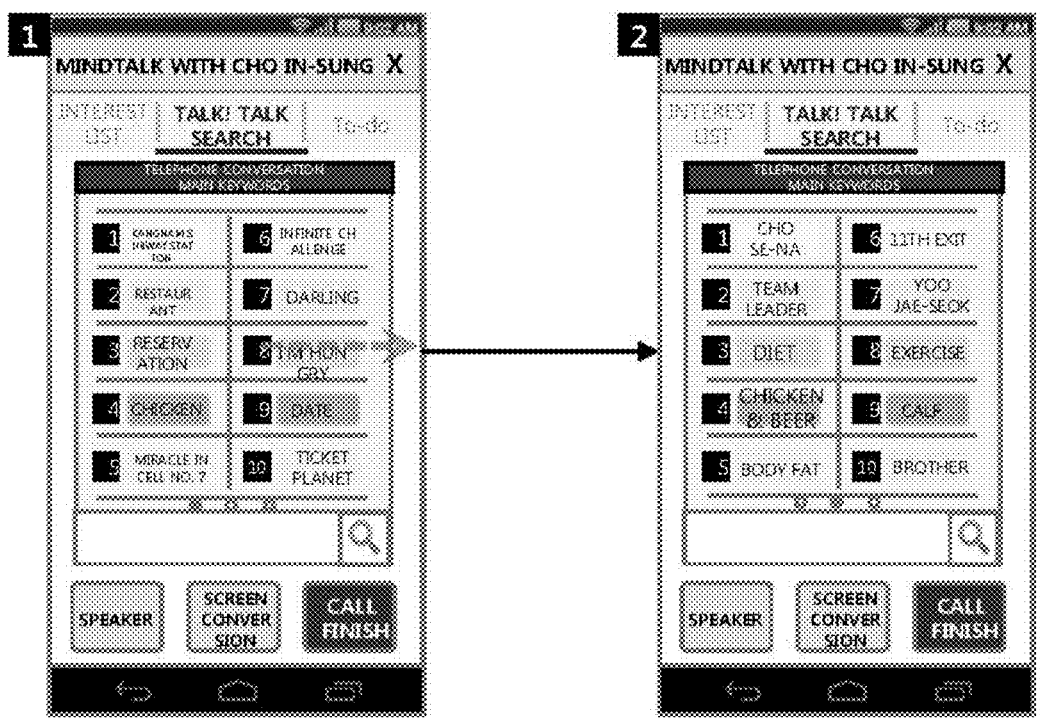

In FIG. 28, basic 10 keywords may be displayed according to real-time rankings based on the procedure of FIG. 27, and a real-time ranking list may be moved through flicking to the left/right of the keyword screen.

FIG. 29 illustrates a keyword combination search procedure. When one keyword is selected from main keyword information, as illustrated in (a) of FIG. 29, for example, a web browser is automatically executed, and a portal search result screen on which the selected keyword is used as search words, is provided. Also, when a keyword that a user wants to delete is tapped long, as illustrated in (b) of FIG. 29, the keyword is deleted, and a blank is sequentially filled with a keyword in the next order.

FIG. 30 illustrates a method of combining and searching keywords. When one or more keywords are dragged/dropped onto a search window and search (reading glasses) is selected, the web browser is executed, and a portal search result screen on which combined words of two keywords are used as search words, is provided.

Figure 31:
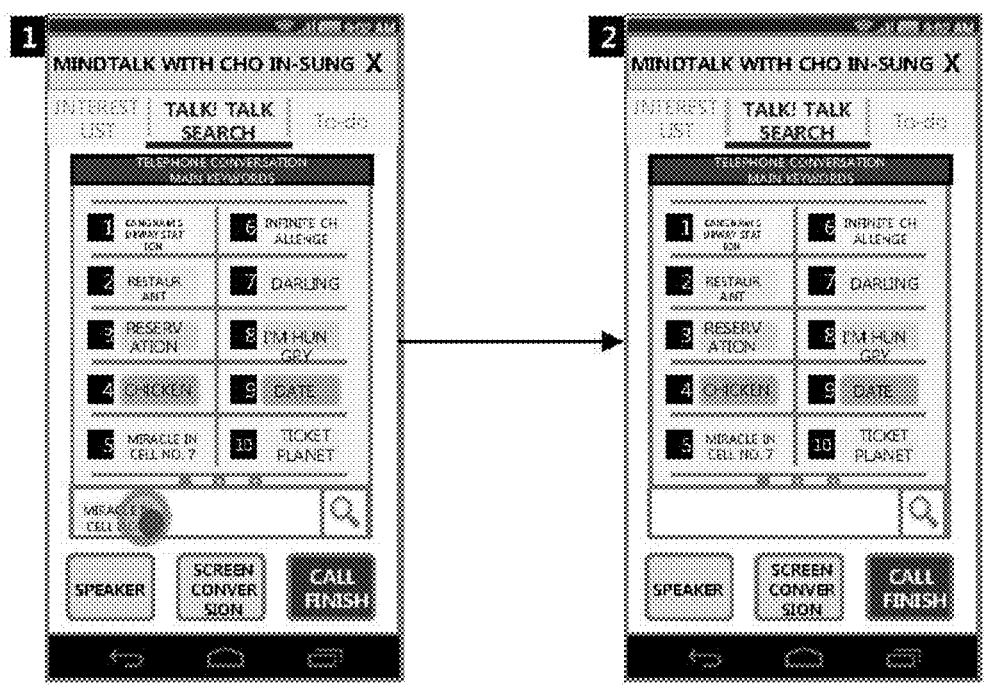

FIG. 31 illustrates a method of editing keywords on the search window. When keywords on the search window are tapped long, as illustrated in (a) of FIG. 31, the keywords may be deleted, and when a blank search window is tapped once, desired search words may be input, and when keywords on the search window are tapped once, content of the keywords may be added/corrected.

Figure 32:
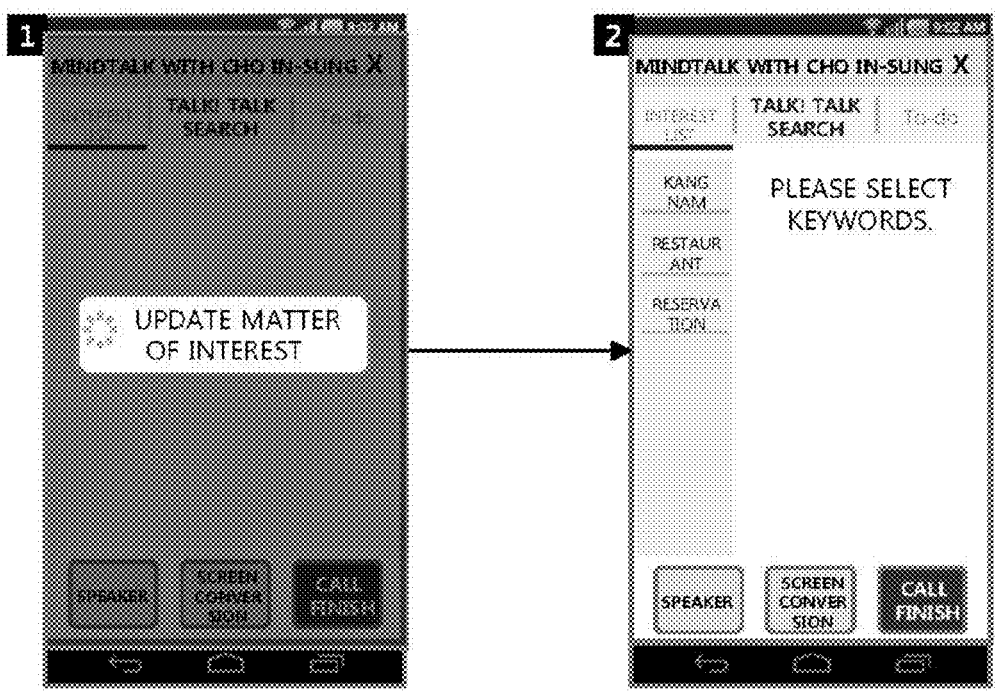

FIG. 32 illustrates an execution screen when an interest list menu is selected while talking over the telephone. When the telephone conversation starts, an interest list information display region is in a blank state, and keywords are exposed to the left according to a keyword generation period (10 seconds) of FIG. 27.

Figure 33:
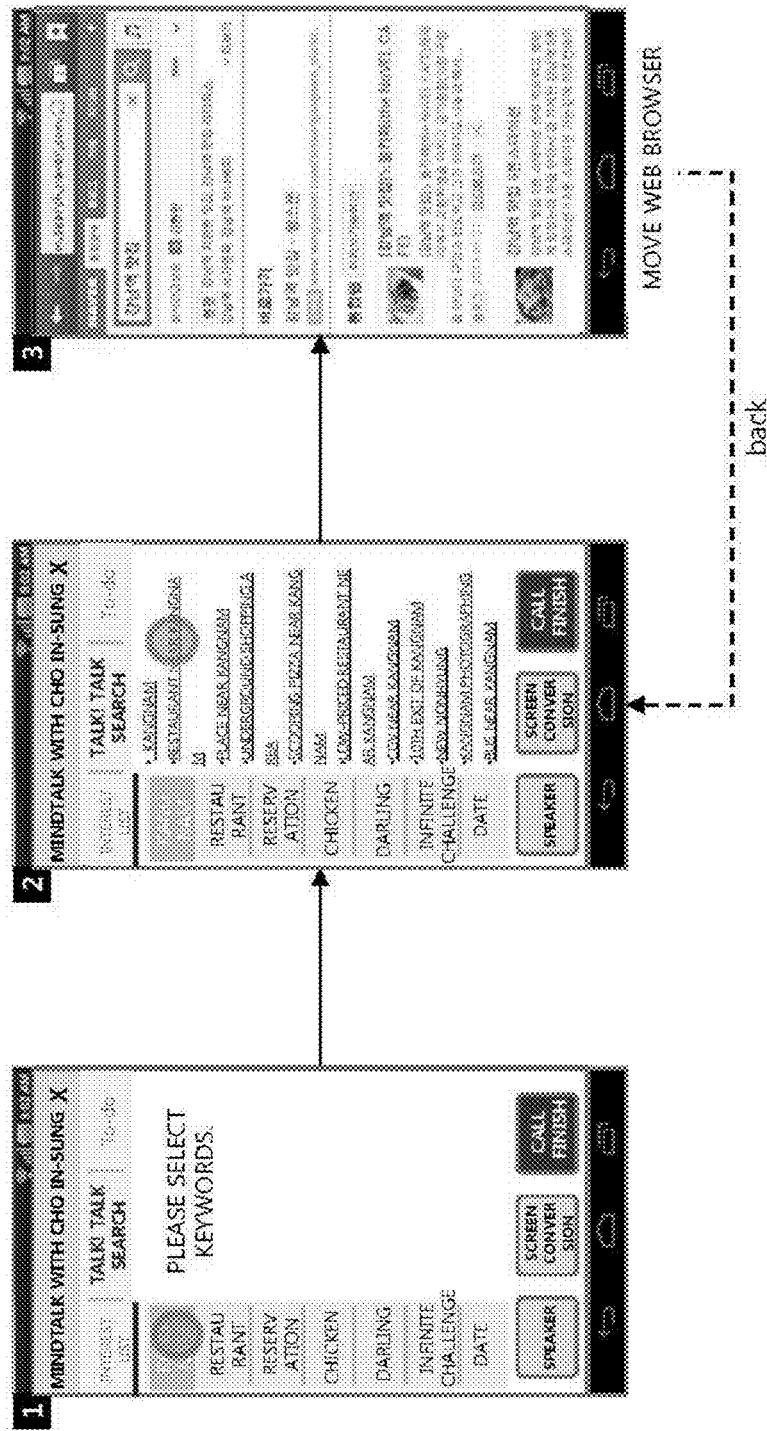

In FIG. 33, when keywords of the interest list are selected, a search list relating to the keywords appears on the right, and when one is selected from associated search words, the result of searching performed based on the associated search words is provided.

Figure 34:
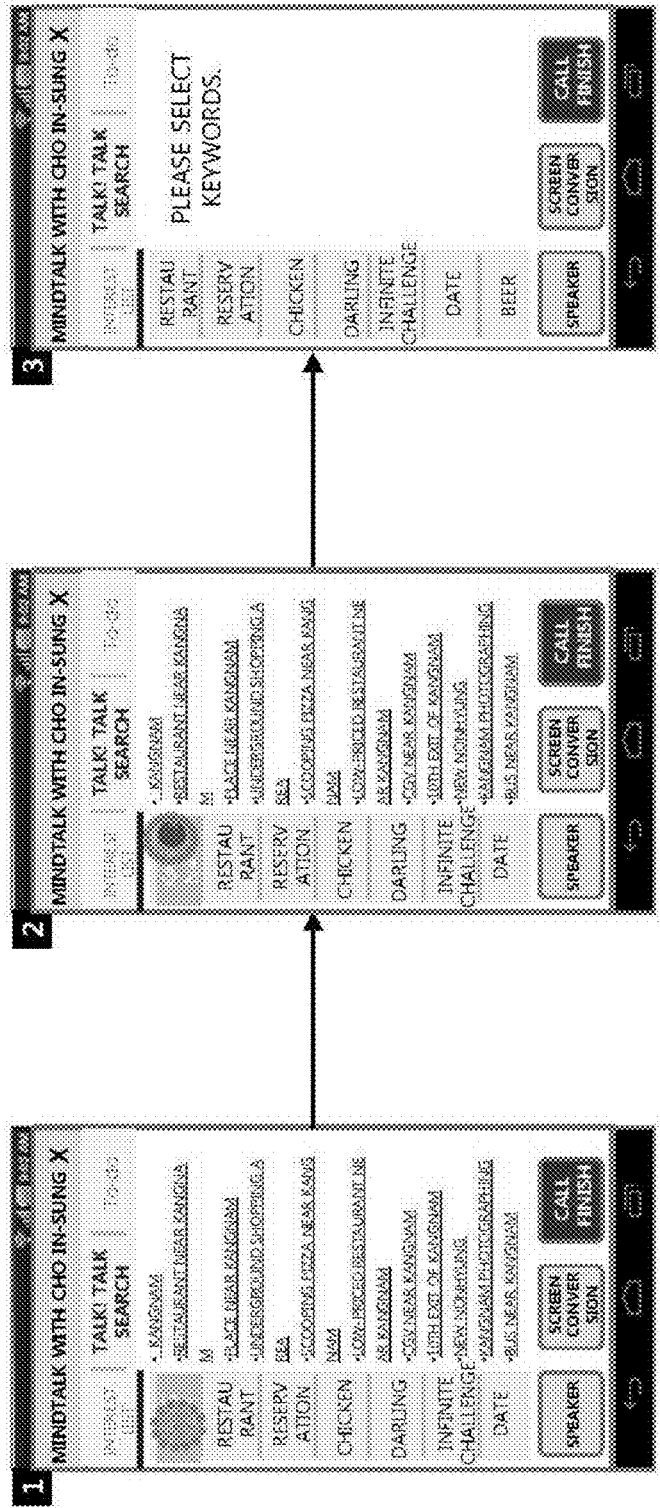

FIG. 34 illustrates a method of deleting keywords of the interest list. When desired keywords are tapped long and an x-button on a right top end of keywords is tapped, the keywords and associated search words are deleted, and a keyword blank is sequentially filled with the following keywords.

Figure 35:

FIG. 35 illustrates various examples in which a To-do list action button (App) is executed. For example, when an occasion button is dragged/dropped up to + of 'Do you want to meet at the Kangnam subway station?' of To-do list information, a predetermined App is driven, and the To-do list information is automatically input to a title region of the predetermined App. Also, when an action button region is flicked, an action button list may be moved, and a new action button that the user wants, i.e., Apps, may be added. Also, the display order of action buttons may be changed, and the action buttons may be deleted.

Figure 37:
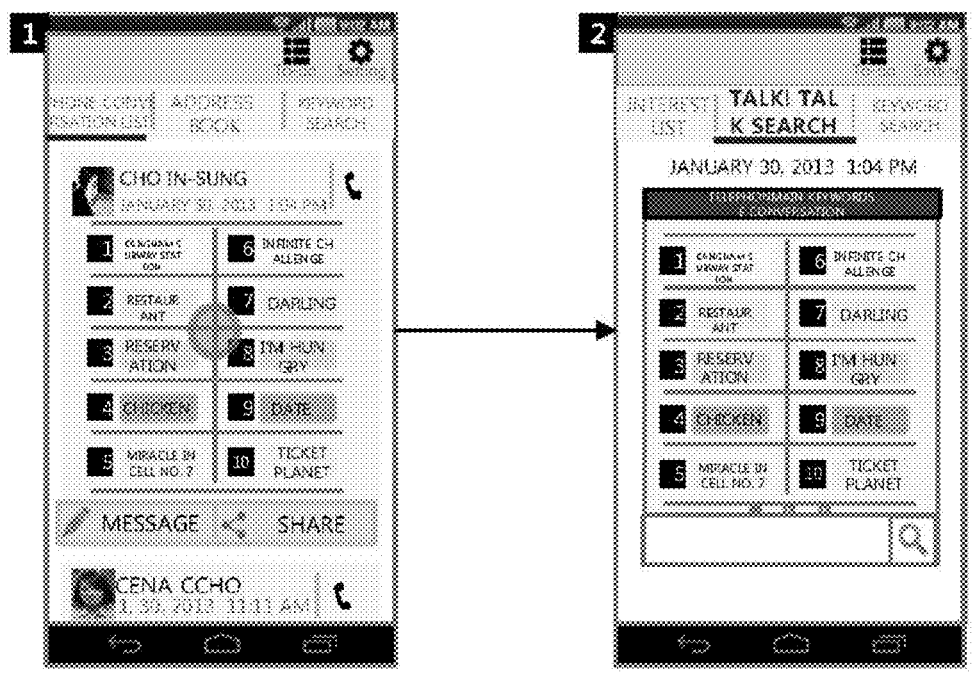

FIGS. 36 and 37 illustrate examples of a result screen after telephone conversation is finished at a user terminal according to the first embodiment of the present invention.

FIG. 36 illustrates a result screen importing method. For example, when a telephone conversation list is selected, as illustrated in (a) of FIG. 36, (main) keyword information (by matching with opponent information in the telephone conversation list, for example) is additionally displayed on the telephone conversation list with an opponent, and when the displayed main keyword information region is tapped and selected, main keyword information ((b) of FIG. 6) corresponding to selection of the "Talk! talk" search menu that is log-stored in a server to correspond to the telephone conversation list is basically received and displayed. When an interest list menu or a To-do list menu is selected from a second result screen of (a) of FIG. 36, interest list information ((a) of FIG. 7) or To-do list information (FIG. 8) that corresponds to the selected menu may be provided from the server.

As illustrated in (b) of FIG. 36, when a friend photo/name is selected, the user may move to a friend page and may display accumulated keywords of a friend.

As illustrated in FIG. 37, when a region in which the main keyword information is displayed, is tapped on a telephone conversation list screen, a screen corresponding to selection of the "Talk! talk" search menu that is log-stored to correspond to the telephone conversation list is displayed, and desired keywords may be selected and deleted from the screen. A blank is sequentially filled with keywords in the next order.

The method for actively providing information based on communication contents according to the one or more embodiments of the present invention described above can be implemented with a computer readable recording medium including program commands for performing operations to be implemented with various computers. The computer readable recording medium may include separately program commands, local data files, local data structures, or a combination thereof. The computer readable recording medium may be specifically designed and configured for embodiments of the present invention or may be well known to one of ordinary skill in the art and may be used. Examples of the computer readable recording medium include magnetic mediums, such as hard disks, floppy disks, and magnetic tapes, optical recording mediums, such as CD-ROMs or DVDs, magneto-optical mediums, such as floptical disks, and hardware devices that are specially configured to store and execute program commands, such as read-only memory (ROM), random-access memory (RAM), and flash memory. The computer readable recording medium can also be a transmission medium including carrier waves through which signals for designating program commands or local data structures are transmitted, such as light, a metal line, or a waveguide. Examples of the program commands may include high level language codes that may be executed by a computer using an interpreter in addition to mechanical language codes created by a complier.

As described above, in accordance with an aspect of the present invention, content of a telephone conversation is analyzed based on voice recognition while talking over the telephone so that a subscriber's matter of interest can be actively extracted and provided. Services according to the present invention are different from existing services in that the services are actively provided when communication, such as voice/video call and chatting, is performed. Also, services according to the present invention are different from existing voice recognition services provided when a user says a desired function, in that the services are based on active operations, whereby the matter of interest is automatically caught based on participants' conversation content. According to the present invention, main keywords or keywords regarding an interest field can be derived based on words, of which saying characteristics between conversation participants meet with a predetermined reference using a voice recognition solution and a situation perception solution, and a user can utilize the keywords during conversation or after conversation is finished, and can inquire them again. Also, when a request type, a command type, or particular words that need to accompany an action among the content of the telephone conversation are included in content of a telephone conversation/conversation, a sentence is converted into a text and is created as a To-do list, and an associated App within a user terminal is imported so that a desired function can be used and conveniences of no need to make an additional arrangement can be provided. Also, a place in which a keyword-based search result is shared with a telephone conversation opponent and is provided while talking over the telephone with the telephone conversation opponent or after the telephone conversation is finished so that conveniences in assisting with decision making between conversation participants can be provided. Also, information extracted from content of a telephone conversation is logged so that the content of the telephone conversation can be reminded only by injuring keywords of the past telephone conversation list and can be re-used and pleasure can be provided to the user. Also, according to the present invention, search is performed by additionally driving an Internet browser after a voice call/a video call/chatting is finished, or a procedure of inputting desired content is simplified through an additional App so that a user's need (search, memo, reservation procedure) can be automatically provided and utilized while talking over the telephone or even after the telephone conversation is finished and the user's conveniences can be maximized. Also, according to the present invention, the result of the telephone conversation is life-logged and is used as contents so that another social pleasure can be provided to the user.

As described above, in accordance with another aspect of the present invention, services according to the present invention are different from existing voice recognition services provided only when the user says a desired function, in that the services are based on active operations, whereby schedule-related information is automatically caught based on participants' conversation content during communication, such as a voice call, a video call, chatting, and messaging services. That is, words or sentences relating to time, a place, and an occasion (event) name that may be reflected on a schedule, can be automatically extracted from a customer's saying content using the voice recognition solution and the situation perception solution and can be reflected on a schedule while talking over the telephone conversation or after the telephone conversation is finished. Thus, since the schedule is arranged only through the telephone conversation, the customer can feel conveniences in managing the schedule without making an additional memo/arrangement work while talking over the telephone.

As described above, in accordance with still another aspect of the present invention, services according to the present invention are different from existing voice recognition services provided only when the user says a desired function, in that the services are based on active operations, whereby name information stored in an address book is automatically caught from participants' conversation content during communication, such as a voice call, a video call, chatting, and messaging services. Also, when a name of a person stored in the address book among the customer's saying content is mentioned, the name is extracted based on the voice recognition solution and the situation perception solution so that address book information, such as a telephone number of the extracted name while talking over the telephone/after the telephone conversation is finished can be displayed and provided or the displayed information can be applied to a communication opponent and direct communication connection can be performed. Thus, only through the telephone conversation, friend information to contact, to be shared and to be checked can be used while talking over the telephone/after the telephone conversation is finished without additional searches so that the customer's conveniences can be improved.

As described above, in accordance with yet still another aspect of the present invention, services according to the present invention are different from existing voice recognition services provided only when the user says a desired function, in that the services are based on active operations, whereby information regarding Apps installed within the user terminal is automatically caught from participants' conversation content during communication, such as a voice call, a video call, chatting, and messaging services. Also, when a To-do list that may be done using particular applications (Apps) of the user terminal among the customer's saying content is mentioned, the To-do list is extracted based on the voice recognition solution and the situation perception solution so that a list of associated Apps can be provided while talking over the telephone or after the telephone conversation is finished and the user can use the Apps immediately. Thus, the To-do list can be used without the need of searching the applications (Apps) installed within the user terminal one by one while talking over the telephone/after the telephone conversation is finished so that the customer's conveniences can be improved.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A terminal for actively providing information based on communication contents, the terminal comprising;
　a display unit that matches information regarding a communicator's matter of interest extracted from contents of a telephone conversation of at least one of the communicator and an opponent, with opponent information and displays a result of matching, wherein either the communicator or the opponent is a calling party,
　wherein the displayed information regarding the communicator's matter of interest comprises words in the contents of the telephone conversation, of which saying characteristics meet a predetermined reference, and the saying characteristics of the words comprise a number of times being mentioned.

2. The terminal of claim 1, wherein the opponent information comprises information regarding the opponent in an address book or a telephone conversation list.

3. The terminal of claim 1, wherein the saying characteristics of the words further comprise at least one of volume size, pronunciation speed, and pronunciation accuracy.

4. The terminal of claim 1, wherein the displayed information regarding the communicator's matter of interest comprises sentences including a request type sentence and a command type sentence, or particular words that need to accompany an action in the contents of the telephone conversation.

5. The terminal of claim 1, further comprising a searching unit that searches detailed information by executing a search tool based on the displayed information regarding the communicator's matter of interest.

6. The terminal of claim 1, further comprising an execution unit that executes an associated App based on the displayed information regarding the communicator's matter of interest.

7. The terminal of claim 1, wherein the display unit adjusts display rankings of the words based on the saying characteristics of the words.

8. The terminal of claim 1, wherein the display unit adjusts letter color, letter shape, or letter size of the words or adjusts size, shape, and color of an image in vicinity of a letter of the words based on the saying characteristics of the words.

9. The terminal of claim 1, wherein the display unit receives, at predetermined time intervals from a server, information regarding the communicator's matter of interest extracted the contents of the telephone conversation in real-time and updates the displayed result of matching based on the received information.

10. The terminal of claim 1, wherein the display unit receives log-stored information regarding the communicator's matter of interest extracted from the contents of the telephone conversation and displays the received log-stored information.

11. A method for actively providing information based on communication contents, comprising:
  matching, by a user terminal, information regarding a communicator's matter of interest extracted based on contents of a telephone conversation of at least one of the communicator and an opponent, with opponent information, wherein either the communicator or the opponent initiates the telephone conversation; and
  displaying a result of matching,
  wherein the displayed information regarding the communicator's matter of interest comprises words in the contents of the telephone conversation, of which saying characteristics meet a predetermined reference, and the saying characteristics of the words comprise a number of times being mentioned.

12. The method of claim 11, wherein the opponent information comprises information regarding the opponent in an address book or a telephone conversation list.

13. The method of claim 11, wherein the saying characteristics of the words further comprise at least one of volume size, pronunciation speed, and pronunciation accuracy.

14. The method of claim 11, wherein the displayed information regarding the communicator's matter of interest comprises sentences including a request type sentence and a command type sentence, or particular words that need to accompany an action in the contents of the telephone conversation.

15. The method of claim 11, further comprising searching detailed information by executing a search tool based on the displayed information regarding the communicator's matter of interest.

16. The method of claim 1, further comprising executing an associated App based on the displayed information regarding the communicator's matter of interest.

17. The method of claim 11, wherein the displaying the result of matching comprises adjusting display rankings of the words based on the saying characteristics of the words.

18. The method of claim 11, wherein the displaying the result of matching comprises adjusting letter color, letter shape, or letter size of the words or adjusting size, shape, and color of an image in vicinity of a letter of the words based on the saying characteristics of the words.

19. The method of claim 11, wherein the displaying the result of matching comprises:
  receiving, at predetermined time intervals from a server, information regarding the communicator's matter of interest extracted the contents of the telephone conversation in real-time; and
  updating the displayed result of matching based on the received information.

20. The method of claim 11, wherein the displaying the result of matching comprises:
  receiving log-stored information regarding the communicator's matter of interest extracted from the contents of the telephone conversation; and
  displaying the received log-stored information.

* * * * *